(12) United States Patent
Pasqua et al.

(10) Patent No.: US 11,258,354 B2
(45) Date of Patent: Feb. 22, 2022

(54) PFC CONTROL CIRCUIT FOR A BOOST CONVERTER, RELATED INTEGRATED CIRCUIT, BOOST CONVERTER, POWER SUPPLY AND METHOD

(71) Applicant: STMicroelectronics S.r.l., Agrate Brianza (IT)

(72) Inventors: Alfio Pasqua, Piedimonte Etneo (IT); Salvatore Tumminaro, Marianopoli (IT); Marco Sammartano, Petrosino (IT); Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/151,397

(22) Filed: Jan. 18, 2021

(65) Prior Publication Data

US 2021/0226527 A1    Jul. 22, 2021

(30) Foreign Application Priority Data

Jan. 17, 2020   (IT) .......................... 102020000000877

(51) Int. Cl.
  *H02M 1/42*     (2007.01)
  *H02M 1/00*     (2006.01)

(52) U.S. Cl.
  CPC ........ *H02M 1/4225* (2013.01); *H02M 1/0032* (2021.05); *H02M 1/0035* (2021.05); *H02M 1/0041* (2021.05)

(58) Field of Classification Search
  CPC ............. H02M 1/4225; H02M 1/0032; H02M 1/0035; H02M 1/0041
  See application file for complete search history.

(56) References Cited

U.S. PATENT DOCUMENTS

| | | | |
|---|---|---|---|
| 5,565,761 A | * | 10/1996 | Hwang ................... H02M 3/07 323/222 |
| 6,011,706 A | * | 1/2000 | Adragna ........... H02M 3/33523 315/411 |
| 6,222,746 B1 | | 4/2001 | Kim |
| 6,252,783 B1 | | 6/2001 | Huh et al. |

(Continued)

OTHER PUBLICATIONS

Abdel-Rahman, Sam, et al., "PFC boost converter design guide—1200 W design example," Infineon, Application Note, Revision 1.1, Feb. 22, 2016, 30 pages.

(Continued)

*Primary Examiner* — Yusef A Ahmed
(74) *Attorney, Agent, or Firm* — Slater Matsil, LLP

(57) ABSTRACT

An embodiment PFC control circuit includes a first terminal providing a drive signal to an electronic switch of a boost converter, a second terminal receiving a feedback signal indicative of an output voltage generated by the boost converter, and a third terminal connected to a compensation network. An error amplifier generates a current as a function of the voltage at the second terminal and a reference voltage, wherein an output of the error amplifier is coupled to the third terminal. A driver circuit generates the drive signal as a function of the voltage at the third terminal, and selectively activates or deactivates the generation of the drive signal as a function of a burst mode enable signal. A detection circuit generates the burst mode enable signal as a function of the voltage at the second terminal.

22 Claims, 13 Drawing Sheets

(56) References Cited

U.S. PATENT DOCUMENTS

| | | | |
|---|---|---|---|
| 6,724,174 B1* | 4/2004 | Esteves | H02M 3/155 323/224 |
| 8,222,772 B1* | 7/2012 | Vinciarelli | H02M 1/4258 307/140 |
| 2002/0140407 A1* | 10/2002 | Hwang | H02M 1/4225 323/207 |
| 2005/0099164 A1* | 5/2005 | Yang | H02M 1/4225 323/266 |
| 2005/0269997 A1* | 12/2005 | Usui | H02M 3/33523 323/207 |
| 2008/0030178 A1* | 2/2008 | Leonard | H02M 3/156 323/282 |
| 2010/0156509 A1* | 6/2010 | Ryu | H02M 1/4208 327/520 |
| 2010/0246220 A1* | 9/2010 | Irving | H02M 1/4225 363/78 |
| 2010/0270984 A1* | 10/2010 | Park | H02M 1/4225 323/211 |
| 2011/0095730 A1 | 4/2011 | Strijker et al. | |
| 2011/0267024 A1* | 11/2011 | Halberstadt | H02M 3/156 323/304 |
| 2012/0026765 A1* | 2/2012 | Adragna | H02M 7/06 363/78 |
| 2012/0099344 A1* | 4/2012 | Adragna | H02M 3/3372 363/21.03 |
| 2013/0250620 A1* | 9/2013 | Huang | H02M 3/24 363/15 |
| 2013/0258722 A1* | 10/2013 | Wang | H02M 5/293 363/21.12 |
| 2014/0063865 A1* | 3/2014 | Nate | H02M 3/33507 363/21.13 |
| 2014/0091720 A1 | 4/2014 | Brinlee | |
| 2014/0369097 A1* | 12/2014 | Prescott | H02M 1/4225 363/89 |
| 2015/0028821 A1* | 1/2015 | Lu | H02M 1/4225 323/208 |
| 2015/0078040 A1 | 3/2015 | Nishijima | |
| 2015/0198634 A1* | 7/2015 | Brinlee | G01R 31/28 324/72.5 |
| 2015/0318777 A1* | 11/2015 | Pasqua | H02M 1/08 363/21.13 |
| 2016/0248323 A1* | 8/2016 | Gritti | H02M 1/4225 |
| 2016/0261199 A1* | 9/2016 | Adragna | H02M 1/08 |
| 2016/0380530 A1* | 12/2016 | Maruyama | H02M 1/4225 323/210 |
| 2017/0222565 A1* | 8/2017 | Sonobe | H02M 3/33546 |
| 2018/0004240 A1* | 1/2018 | Gritti | H02M 3/33507 |
| 2018/0041119 A1* | 2/2018 | Zhang | H02M 1/4258 |
| 2018/0226884 A1* | 8/2018 | Hwang | H02M 1/4266 |
| 2019/0341852 A1* | 11/2019 | Fahlenkamp | H02M 3/33515 |
| 2020/0403497 A1* | 12/2020 | Scappatura | H02M 1/4225 |

OTHER PUBLICATIONS

Stmicroelectronics, "Solution for designing a transition mode PFC preregulator with the L6562A," AN2761 Application Note, Revision 2, Nov. 17, 2009, 36 pages.

* cited by examiner

PFC CONTROL CIRCUIT FOR A BOOST CONVERTER, RELATED INTEGRATED CIRCUIT, BOOST CONVERTER, POWER SUPPLY AND METHOD

CROSS-REFERENCE TO RELATED APPLICATIONS

This application claims the benefit of Italian Application No. 102020000000877, filed on Jan. 17, 2020, which application is hereby incorporated herein by reference.

TECHNICAL FIELD

The embodiments of the present description generally relate to a method and apparatus for a PFC control circuit for a boost converter.

BACKGROUND

Switched-mode power supplies are well-known in the art. For example, FIG. 1 shows a known two-stage electronic power supply.

In the example, the electronic converter comprises two input terminals 200a and 200b configured to receive an AC input voltage $V_{in,AC}$, such as 230 VAC with 50 Hz or 110 VAC with 60 Hz, and two output terminals 202a and 202b configured to provide a regulated output voltage $V_{out}$ or a regulated output current $i_{out}$ to a load 30.

Specifically, in the example considered, the AC input voltage $V_{in,AC}$ is converted via a rectifier circuit 206, such as a bridge rectifier, into a DC voltage, i.e. the input terminals of the rectifier circuit are coupled to the input terminals 200a and 200b, and output terminals 208a and 208b of the rectifier circuit provide a DC voltage $V_{in,DC}$. Often a filter circuit is connected between the input terminals 200a and 200b and the input terminals of the rectifier circuit 206.

In the example considered, the electronic power supply comprises two stages:
a first stage 210 configured to receive via the terminals 208a and 208b the DC voltage $V_{in,DC}$ and to generate at two terminals 212a and 212b a regulated DC voltage $V_{bus}$; and
a second stage 214 configured to receive via the terminals 212a and 212b the voltage $V_{bus}$ and to generate at the output terminals 202a and 202b a regulated output voltage $V_{out}$ or a regulated output current $i_{out}$.

Specifically, as described e.g. in U.S. Pat. No. 6,222,746 B1 such a two-stage architecture has the advantage that the first stage 210 may be an electronic converter with Power Factor Correction (PFC), which thus generates a regulated voltage $V_{bus}$, while improving the power factor of the power supply. For example, often the first stage is implemented with a PFC boost converter. Conversely, based on the value of the voltage $V_{bus}$ and the power supply requirements of the load 30, the second stage 214 may be implemented with various kinds of electronic converters, such as buck, buck-boost, flyback, forward, half-bridge or full-bridge converters.

For example, FIG. 2A shows an example of the PFC boost converter 210.

Specifically, in the example considered, the stage 210 comprises:
an inductance L1, such as an inductor, connected (e.g. directly) between the positive terminal 208a and a switching node SN;
an electronic switch SW1, such as a Field-Effect Transistor (FET), such as a Metal-Oxide-Semiconductor Field-Effect Transistors (MOSFET), e.g. a n-channel FET, e.g. a NMOS, having a current path connected (e.g. directly) between the switching node SN and the negative terminal 208b; and
a further electronic switch SW2, such as a diode or a further FET, such as a p-channel FET, e.g. a PMOS, having a current path connected (e.g. directly) between the switching node SN and the positive terminal 212a, wherein the negative terminal 212b is connected to the negative terminal 208b; and
a capacitor COUT connected (e.g. directly) between the terminals 212a and 212b.

Optionally, the stage 210 may also comprise a capacitor CIN connected (e.g. directly) between the terminals 208a and 208b. In general, the respective capacitance between the terminals 208a and 208b should be small in order to not influence significantly the power factor of the power supply. In fact, in PFC stage 210, the voltage $V_{in,DC}$ at the terminals 208a and 208b corresponds essentially to positive sinusoidal half-waves.

In the example considered, the PFC stage 210 comprises also a PFC control circuit 2112 configured to generate a drive signal DRV1 for the electronic switch SW1 and optionally the electronic switch SW2 (if a controllable electronic switch is used).

As shown in FIG. 2B, the PFC control circuit 2112 is usually configured to drive the electronic switch SW1 with switching cycles $T_{SW}$ comprising:
a switch-on phase $T_{ON}$, where the switch SW1 is closed and the diode/switch SW2 is opened, whereby the current flowing through the inductance L1 increases; and
a switch-off phase $T_{OFF}$, where the switch SW1 is opened and the diode/switch SW2 is closed, whereby the current of the inductance L1 passes through diode/switch SW2 towards output 212a/212b, thereby charging the capacitor COUT.

Therefore, the increase of the current flowing through inductance L1 during the on-state depends on the duration of the switch-on duration $T_{ON}$ and on the input voltage $V_{in,DC}$. Specifically, assuming an ideal behavior of the boost converter, when the switch-on time $T_{ON}$ remains constant, the peak value of the input current $i_{in,DC}$ received via the terminals 208a and 208b at the end of the switch-on time $T_{ON}$ is substantially proportional to the value of the voltage $V_{in,DC}$. Therefore, the boost converter is particularly suitable to be used within a PFC converter.

The various modes of operation of a PFC boost converter are well known in the art. For example, in this context may be cited STMicroelectronics, Application note AN2761, "Solution for designing a transition mode PFC preregulator with the L6562A", November 2009, Doc ID 14690 Rev 2, or Sam Abdel-Rahman, Franz Stückler, Ken Siu, Application Note, "PFC boost converter design guide—1200 W design example", Revision 1.1, 2016-02-22.

Substantially, the PFC control circuit 2112 may be configured to operate the boost converter in three modes: continuous conduction mode (CCM), discontinuous conduction mode (DCM) or critical conduction mode (CrCM), often also identified as transition mode (TM).

As schematically shown in FIG. 2A, these control schemes have in common, that a voltage sensor 2110 is used to generate a feedback signal FB1 indicative of (and preferably proportional to) the voltage $V_{bus}$ at the terminals 212a/212b. For example, in the example considered, the voltage sensor 2110 is implemented with a resistive voltage divider comprising two resistors R1 and R2 connected between the terminals 212a and 212b.

In the example considered, the feedback signal FB1 is provided to an error amplifier 2114 configured to generate an error signal $V_{COMP1}$ as a function of the feedback signal FB1 and a reference signal REF1 indicative of a requested value for the voltage $V_{bus}$. Typically, the error amplifier 2114, such as an operation amplifier, has associated a feedback/compensation network 2118, which permits to implement the error amplifier 2114 as a regulator having an Integral (I) and/or Proportional (P) component, and optionally a Derivative (D) component. More specifically, the error amplifier 2114 usually provides a current signal which is converted by the feedback/compensation network 2118 into a voltage error signal $V_{COMP1}$.

A driver circuit 2116 is then configured to generate the drive signal(s) DRV1 as a function of the error signal $V_{COMP1}$. For example, as mentioned before, the driver circuit 2116 may vary the switch-on time $T_{ON}$ as a function of the signal $V_{COMP1}$.

Often the feedback via the error amplifier 2114 represents an outer (slow) control loop, while the driver circuit 2116 may also implement an inner (fast) control loop, e.g. in order to directly regulate the current flowing through the inductance L1. For example, as schematically shown in FIG. 2A, for this purpose, the boost converter may also comprise a current sensor 2111, such as a resistor RS, configured to generate a signal CS indicative of (and preferably proportional to) the current flowing through the inductance L1, at least during one of the switch-on or the switch-off period.

FIG. 3 shows a scheme of a generic regulated DC/DC converter 214.

Specifically, a generic switched-mode DC/DC converter comprises:
- a switching stage 2140 comprising one or more electronic switches SW and one or more reactive components, such as inductances L and/or capacitances C;
- a measurement circuit 2142 configured to generate a feedback signal FB2 indicative of (and preferably proportional to) the output current $i_{out}$ or the output voltage $V_{out}$ (based on whether the converter has to provide a regulated current or a regulated voltage), such as a resistive voltage divider comprising two resistors R3 and R4 connected between the terminals 202a and 202b; and
- a control circuit 2144 configured to generate one or more drive signals DRV2 for the one or more electronic switches SW.

For example, similar to what has been described with respect to FIG. 2A, also the control circuit 2144 may comprise:
- an error amplifier 2146 having associated a feedback network 2150, wherein the error amplifier 2146 is configured to generate an error signal $V_{COMP2}$ as a function of the feedback signal FB2 and a reference signal REF2 indicative of a requested value for the output current $i_{out}$ or the output voltage $V_{out}$; and
- a driver circuit 2148 configured to generate the one or more drive signals DRV2 as a function of the error signal $V_{COMP2}$.

Typically, the above described modes DCM, CCM and CrCM, are used, when a load 30 is connected to the terminals 202a and 202b. Conversely, when no load 30 is connected to the terminals 202a and 202b, or in general when the load between the terminals 202a and 202b is small, the regulation with the modes DCM, CCM and CrCM becomes usually inefficient, and the control circuit 2144 may switch to a Burst Mode (BM), wherein the control circuit 2144 activates the switching of the electronic switch(es) SW for one or more switching cycles and then deactivates the switching. Similarly, also the control circuit 2112 of the converter 210 may be configured to selectively switch to a burst mode at low load conditions.

For example, the control circuit 2112 (or similarly the control circuit 2144) may activate the burst mode directly as a function of the feedback signal FB1 (FB2) or as a function of the error signal $V_{COMP1}$ ($V_{COMP2}$).

For example, at low load conditions, the respective output voltage $V_{bus}$ ($V_{out}$) may increase and the control circuit 2112 (2144) may be configured to activate the burst mode, e.g. by simply stopping the switching activity, when the voltage $V_{bus}$ ($V_{out}$) exceeds an upper threshold and the normal operation mode (DCM, CCM or CrCM), e.g. by resuming the switching activity, when the voltage $V_{bus}$ ($V_{out}$) falls below a lower threshold.

Instead, when using an error amplifier 2114 (2146) with an integral component in the feedback network 2118 (2150), such as a capacitor, the respective error signal $V_{COMP1}$ ($V_{COMP2}$) will decrease when the load decreases. Substantially, when using an output voltage regulation for the voltage $V_{bus}$ ($V_{out}$) the error signal $V_{COMP1}$ ($V_{COMP2}$) is (approximately) proportional to the current supplied by the converter 210 (214). Thus, in this case, the control circuit 2112 (2144) may be configured to activate the burst mode, e.g. by simply stopping the switching activity, when the error signal $V_{COMP1}$ ($V_{COMP2}$) falls below a lower threshold and the normal operation mode (DCM, CCM or CrCM), e.g. by resuming the switching activity, when the error signal $V_{COMP1}$ ($V_{COMP2}$) exceeds an upper threshold. For example, if the error signal $V_{COMP1}$ ($V_{COMP2}$) is lower than the lower threshold, the control circuit 2112 (2144) inhibits the switching activity. In this way, the current supplied by the converter 210 (214) is stopped. In any case, e.g. due to power losses or because the load 30 still consumes energy, the voltage $V_{bus}$ ($V_{out}$) and similarly the feedback signal FB1 (FB2) decreases. This causes an increase of the error signal $V_{COMP1}$ ($V_{COMP2}$). Accordingly, when the error signal $V_{COMP1}$ ($V_{COMP2}$) exceeds the upper threshold, the control circuit 2112/2144 may restart the switching that transfers energy to the load.

As shown in FIG. 4, recently control circuits 2112 and 2144 have been proposed, which support a communication via a signal EXT_BM of the burst mode from the control circuit 2144 of the converter 214 to the control circuit 2112 of the PFC converter 210. For example, in this context may be cited the Datasheet of the integrated circuit STNRG011, "*Digital combo multi-mode PFC and time-shift LLC resonant controller*", which is an integrated circuit comprises both a control circuit 2112 for a PFC converter 210 and a control circuit 2144 for an LLC electronic converter 214.

For example, the control circuit 2144 may be configured to set the signal EXT_BM to high, when the control circuit 2144 has activated the burst mode, e.g. because the signal FB2 exceeds an upper threshold or the error signal $V_{COMP2}$ falls below a lower threshold. This signal EXT_BM is thus provided to the PFC control circuit 2112. For example, the PFC control circuit 2112 may deactivate the switching activity of the boost converter (in particular the electronic switch SW1) in response to the signal EXT_BM. This mechanism allows to synchronize the BM state of the first stage 210 with that of the second stage 214 improving the efficiency of the whole system consisting of both conversion stages. In this way the BM state is imposed for both stages by the second stage.

In general, the PFC control circuit 2112 may comprise both the External Burst Mode (EBM) function as well as the (internal) BM function, i.e. the PFC control circuit 2112 may stop the switching activity when at least one of the following conditions is satisfied:

when the signal EXT_BM is set to a given logic level; or
when the signal FB2 exceeds an upper threshold or preferably the error signal $V_{COMP2}$ falls below a lower threshold.

As shown in FIG. 4, the PFC control circuit 2112 requires thus an additional terminal for receiving the signal EXT_BM from the control circuit 2144.

The inventors have observed that this may be a minor issue when both control circuits 2112 and 2144 are integrated in a common integrated circuit. Conversely, when the PFC control circuit 2112 is provided in a separate integrated circuit, an addition pad (or similarly an additional pin of a respective IC package) is required for connecting the pad/pin to the integrated circuit of the control circuit 2144.

SUMMARY

Considering the foregoing, it is therefore an object of various embodiments to provide a PFC control circuit which supports the external burst mode, but which does not require an additional pad/pin for the signal EXT_BM.

According to one or more embodiments, one or more of the above objects are achieved by a PFC control circuit for a boost converter having the distinctive elements set forth specifically in the ensuing claims. Embodiments moreover concern a related integrated circuit, boost converter, power supply and method.

The claims form an integral part of the technical teaching of the description provided herein.

As mentioned before, various embodiments of the present disclosure relate to a PFC control circuit for a boost converter. In various embodiments, the PFC control circuit, e.g. in the form of an integrated circuit, comprises a first terminal configured to provide a drive signal to an electronic switch of the boost converter, a second terminal configured to be connected to a voltage sensor in order to receive a feedback signal indicative of an output voltage generated by the boost converter and a third terminal configured to be connected to a compensation network.

In various embodiments, the PFC control circuit comprises an error amplifier configured to generate a current as a function of the voltage at the second terminal and a reference voltage, wherein an output of the error amplifier is coupled to the third terminal, and a driver circuit configured to generate the drive signal as a function of the voltage at the third terminal, wherein the driver circuit is configured selectively activate or deactivate the generation of the drive signal as a function of a burst mode enable signal.

For example, in various embodiments, such a PFC control circuit may be used to control a boost converter. For example, such a boost converter may comprise a first and a second input terminal configured to receive a DC input voltage, and a first and a second output terminal configured to provide an output voltage.

Specifically, in various embodiments, the boost converter comprises an inductance and an electronic switch connected in series between the first and second input terminals, wherein the electronic switch is driven as a function of the signal at the first terminal of the PFC control circuit. A further electronic switch, such as a diode, is connected between an intermediate point between the inductance and the electronic switch, and the first output terminal, wherein the second output terminal is connected to the second input terminal. An output capacitor is connected between the first and the second output terminals. A voltage sensor is configured to generate at the second terminal of the PFC control circuit a feedback signal indicative of the output voltage. A compensation network is connected to the third terminal of the PFC control circuit, wherein the compensation network comprises at least one capacitance.

As mentioned before, in various embodiments, such a boost converter may be used in combination with a DC/DC electronic converter configured to receive the output voltage generated by the boost converter and provide at output a regulated output current or regulated output voltage. Specifically, in various embodiments, the DC/DC electronic converter is configured to generate an external burst mode signal.

In various embodiments, the boost converter comprises also an electronic control switch (external with respect to the integrated circuit of the PFC control circuit) configured to connect the second terminal of the PFC control circuit to a further reference voltage as a function of an external burst mode signal. Specifically, in various embodiments, the further reference voltage is smaller than 80%, preferably smaller than 50%, of the reference voltage. Accordingly, when the external burst mode signal is set, the feedback signal at the second terminal varies. In various embodiments, this variation is detected by the PFC control circuit.

For example, in various embodiments, the PFC control circuit comprises a detection circuit configured to generate the burst mode enable signal as a function of the voltage at the second terminal, wherein the detection circuit is configured to:

set the burst mode enable signal to a first logic level, thereby deactivating the generation of the drive signal by the driver circuit, when the voltage at the second terminal falls below a first threshold, the first threshold being smaller than 80% of the reference voltage; and
set the burst mode enable signal to a second logic level, thereby activating the generation of the drive signal by the driver circuit, when the voltage at the second terminal exceeds a second threshold, the second threshold corresponding to or being greater than the first threshold and being smaller than 80% of the reference voltage.

Specifically, in various embodiments, the first threshold and the second threshold are between 1% and 50%, preferably between 5% and 25%, of the reference voltage.

Accordingly, in various embodiments, a first (small) output load condition is detected within the DC/DC electronic converter. In response to the detection of the first output load condition, the DC/DC electronic converter deactivates the switching activity and sets the external burst mode signal to a first logic level, thereby closing the electronic control switch. In turn, the PFC control circuit sets the burst mode enable signal to the first logic level, thereby deactivating the generation of the drive signal by the driver circuit, when the voltage at the second terminal falls below the first threshold. Similarly, when the DC/DC electronic converter detects a second (higher) output load condition, the DC/DC electronic converter may activate the switching activity and set the external burst mode signal to a second logic level, thereby opening the electronic control switch. In turn, the PFC control circuit sets the burst mode enable signal to the second logic level, thereby activating the generation of the drive signal by the driver circuit, when the voltage at the second terminal exceeds the second threshold.

In various embodiments, the PFC control circuit is configured to deactivate the error amplifier when the burst mode enable signal is set to the first logic level.

Alternatively, the detection circuit may be configured to generate on open-loop control signal as a function of the voltage at the second terminal, wherein the detection circuit is configured to:
  set the open-loop control signal to a first logic level, when the voltage at the second terminal falls below the first threshold; and
  set the open-loop control signal to a second logic level, when the voltage at the second terminal exceeds a further threshold, the further threshold being greater than the second threshold.

In this case, the PFC control circuit may be configured to deactivate the error amplifier when the open-loop control signal is set to the first logic level. Accordingly, in various embodiments, the driver circuit is already activated when the voltage at the second terminal exceeds the second threshold, and the PFC control circuit operates with an open loop control until the voltage at the second terminal reaches/exceeds the further threshold. For example, in various embodiments, the further threshold is between 90% and 100% of the reference voltage.

In various embodiments, in order to reduce the time during which the PFC control circuit operates with the open-loop control, the detection circuit is configured to generate a boost control signal as a function of the voltage at the second terminal, wherein the detection circuit is configured to:
  set the boost control signal to a first logic level, when the voltage at the second terminal exceeds the second threshold; and
  set the boost control signal to a second logic level, when the voltage at the second terminal exceeds the further threshold.

Specifically, in the case, the PFC control circuit may comprise a voltage or current generator configured to apply a voltage or current, respectively, to the second terminal when the boost control signal has the first logic level. For example, in various embodiments, the PFC control circuit comprises a first current generator configured to apply a first current to the second terminal when the boost control signal has the first logic level, and a second current generator configured to apply a second current to the second terminal when the open-loop control signal or the burst mode enable signal has the respective first logic level, the first current being greater than the second current.

In various embodiments, the PFC control circuit may also be configured to deactivate the switching activity when a low load condition is detected. For example, in various embodiments, the PFC control circuit comprises a comparator circuit configured to deactivate the generation of the drive signal by the driver circuit, when the voltage at the third terminal falls below a third threshold and activate the generation of the drive signal by the driver circuit, when the voltage at the third terminal exceeds a fourth threshold.

BRIEF DESCRIPTION OF THE DRAWINGS

The embodiments of the present disclosure will now be described with reference to the annexed plates of drawings, which are provided purely to way of non-limiting example and in which.

The features and advantages of the present invention will become apparent from the following detailed description of practical embodiments thereof, shown by way of non-limiting example in the accompanying drawings, in which.

DETAILED DESCRIPTION OF ILLUSTRATIVE EMBODIMENTS

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

In FIGS. 5 to 15 described below, parts, elements or components that have already been described with reference to FIGS. 1 to 4 are designated by the same references used previously in these figures. The description of these elements has already been made and will not be repeated in what follows in order not to burden the present detailed description.

As mentioned before, various embodiments of the present description concern solutions for communicating a burst mode signal BM_EXT from the control circuit 2144 of the DC/DC stage 214 to the PFC control circuit 2112 of the PFC stage 210. For a general description of a two-stage electronic converter reference can be made to the previous description of FIGS. 1 to 4.

Generally, it is not particularly relevant for the scope of the present disclosure how the control circuit 2144 generates the signal BM_EXT.

Figure 5:
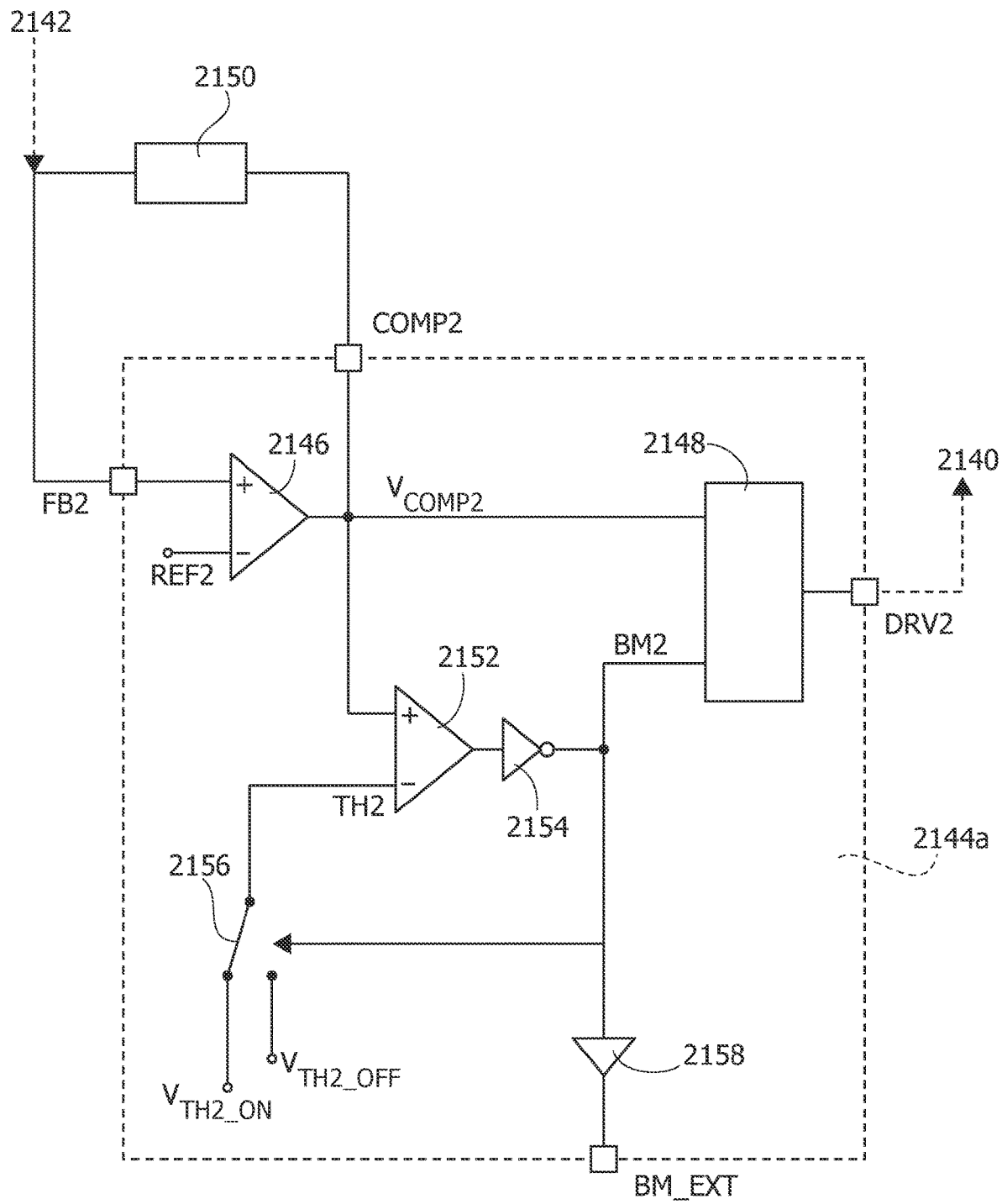
FIG. 5 shows an embodiment of a control circuit for a DC/DC electronic converter generating an external burst mode signal.

In any case, FIG. 5 shows a possible embodiment of a control circuit 2144a for a DC/DC converter 214. Specifically, in the embodiment considered, the control circuit 2144a is implemented in an integrated circuit comprising (at least, e.g. in addition to usual power supply terminals):

a terminal configured to be connected to a feedback circuit 2142 in order to receive a feedback signal FB2;
a terminal configured to be connected to a switching stage 2140 of the converter 214 in order to provide one or more drive signals DRV2 to the switching stage 2140; and
a terminal configured to be connected to a PFC control circuit in order to provide a burst mode signal BM_EXT to the PFC control circuit.

In the embodiment considered, the control circuit 2144a comprises again an error amplifier 2146, such as an operational amplifier, configured to determine an error signal $V_{COMP2}$ as a function of the feedback signal FB2 and a reference signal REF2. In general, the feedback network 2150 of the error amplifier 2146 may be integrated in the integrated circuit or may be external with respect to the integrated circuit. For example, the integrated circuit of the control circuit 2144a may comprise a terminal COMP2 connected to the output of the error amplifier 2146 and the feedback network may be connected between the terminals COMP2 and the feedback terminal of the signal FB2.

In the embodiment considered, the error signal $V_{COMP2}$ is provided to a driver circuit 2148 configured to generate the one or more drive signals DRV2 for the switching stage 2140 as a function of the error signal $V_{COMP2}$.

In the embodiment considered, the driver circuit 2148 is configured to receive also a burst mode signal BM2 indicating whether the driver circuit 2148 should stop/inhibit the generation of the drive signal DRV2.

As described in the foregoing, the control circuit 2144a may be configured to generate the burst mode signal BM2 as a function of directly the feedback signal FB2 or as a function of the error signal $V_{COMP2}$.

For example, in the embodiment considered, the control circuit 2144a comprises a comparator circuit configured to set the signal BM2 to:

a first logic level (e.g. high) indicating that the burst mode should be activated, when the error signal $V_{COMP2}$ falls below a lower threshold $V_{TH2\_ON}$; and
a second logic level (e.g. low) indicating that the burst mode should be deactivated, when the error signal $V_{COMP2}$ exceeds an upper threshold $V_{TH2\_OFF}$, where the upper threshold $V_{TH2\_OFF}$ is greater than the lower threshold $V_{TH2\_ON}$.

For example, as schematically shown in FIG. 5, such a comparison circuit may comprise a comparator with hysteresis, e.g. implemented with an analog comparator 2152 configured to compare the error signal $V_{COMP2}$ with a threshold value TH2, wherein the threshold value TH2 is selected, e.g. via a selector 2156, as the lower threshold $V_{TH2\_ON}$ or the upper threshold $V_{TH2\_OFF}$ as a function of the signal at the output of the comparator 2152. Considering the connection of the input terminals of the comparator 2152 and the logic levels of the signal BM2, the signal BM2 may also correspond to the inverted version of the comparison signal at the output of the comparator 2152, as schematically shown via an inverter 2154.

Accordingly, in the embodiment considered, the signal BM_EXT is determined as a function of the burst mode signal BM2, and indicates thus whether the control circuit 2144a has activated the burst mode or a normal operating mode, such as CCM, DCM or CrCM. For example, the signal BM_EXT may correspond directly to the signal BM2 or may by determined as a function of the signal BM2, e.g. via a buffer 2158.

Figure 6:
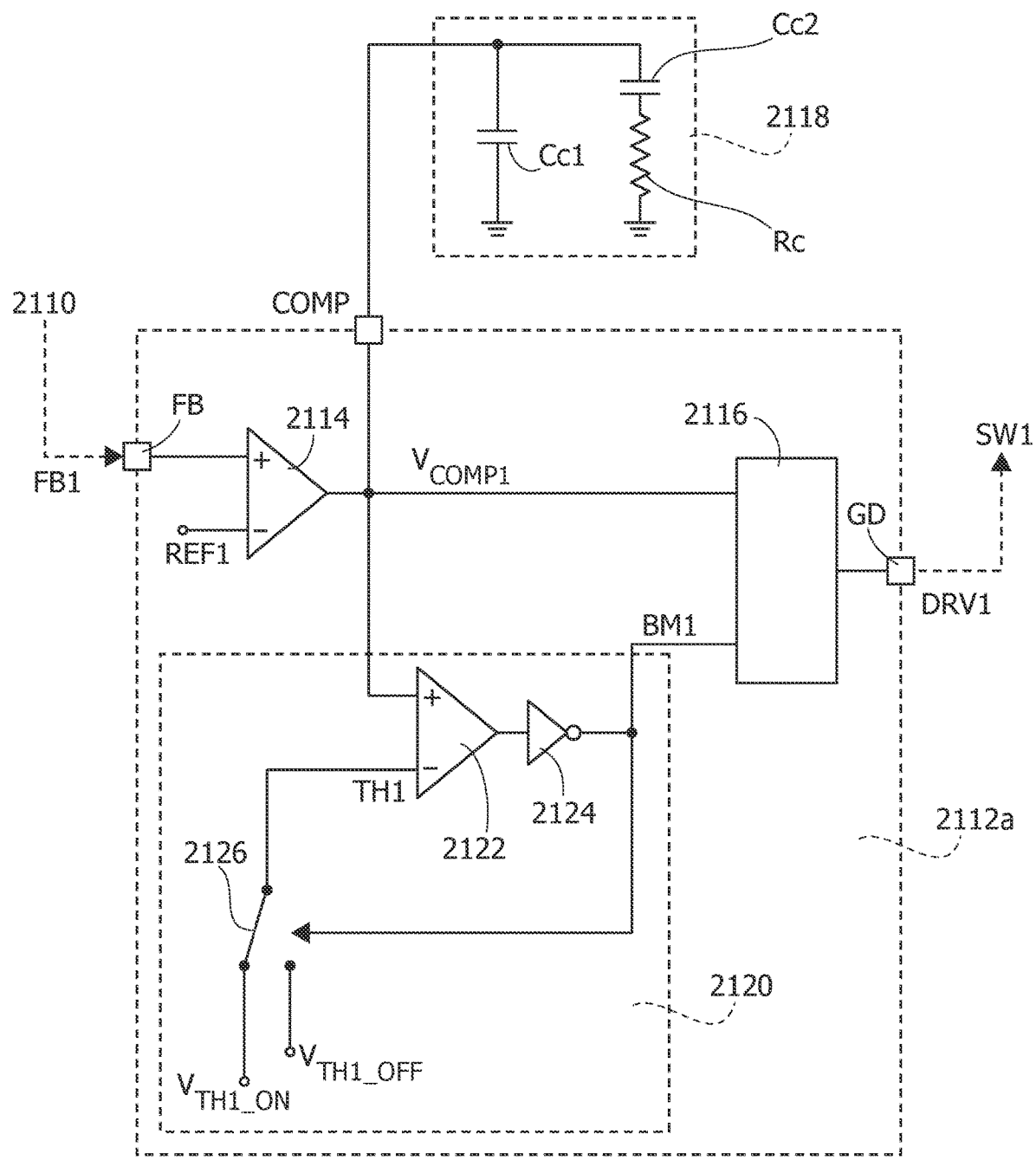
FIG. 6 shows an embodiment of a control circuit for a PFC boost converter configured to selectively activate a burst mode.

FIG. 6 shows a possible embodiment of a PFC control circuit 2112a for the boost converter 210. Specifically, in the embodiment considered, the control circuit 2112a is implemented in an integrated circuit comprising (at least, e.g. in addition to usual power supply terminals):

a terminal FB configured to be connected to a feedback circuit 2110 in order to receive a feedback signal FB1 indicative of the voltage $V_{bus}$; and
a terminal GD configured to provide a drive signal DRV1 to the electronic switch SW1 (and optionally a terminal for providing a drive signal to the electronic switch SW2).

In the embodiment considered, the control circuit 2112a comprises again an error amplifier 2114, such as an operational amplifier, configured to determine an error signal $V_{COMP1}$ as a function of the feedback signal FB1 at the terminal FB and a reference signal REF1. In general, the feedback network 2118 of the error amplifier 2114 may be integrated in the integrated circuit or preferably is external with respect to the integrated circuit. For example, the integrated circuit of the control circuit 2112a may comprise a terminal COMP connected to the output of the error amplifier 2114 and the feedback network 2118 may be connected, e.g., between the terminals COMP and the feedback terminal FB, or between the terminals COMP and ground GND. For example, in the embodiment considered, the feedback network 2118 comprises:

a capacitor Cc1 connected directly between the terminal COMP1 and ground GND, and/or
a capacitor Cc2 and a resistor Rc connected directly in series between the terminals COMP and ground GND.

In the embodiment considered, the error signal $V_{COMP1}$ is provided to a driver circuit 2116 configured to generate at the terminal GD the drive signal DRV1 for the electronic switch SW1 as a function of the error signal $V_{COMP1}$. Optionally, the driver circuit 2116 may also generate the drive signal for the electronic switch SW2.

In the embodiment considered, the driver circuit 2116 is configured to receive also a burst mode signal BM1 indicating whether the driver circuit 2116 should stop/inhibit the generation of the drive signal DRV1. Specifically, when the driver circuit 2116 stops the generation of the drive signal DRV1, the driver circuit 2116 is configured to maintain opened the electronic switch SW1, e.g. by setting the terminal GD/drive signal DRV1 to low.

As described in the foregoing, also the control circuit 2112a may be configured to generate the burst mode signal BM1 as a function of directly the feedback signal FB1 or as a function of the error signal $V_{COMP1}$.

For example, in the embodiment considered, the control circuit 2112a comprises a comparator circuit 2120 configured to set the signal BM1 to:
- a first logic level (e.g. high) indicating that the burst mode should be activated, when the error signal $V_{COMP1}$ falls below a lower threshold $V_{TH1\_ON}$; and
- a second logic level (e.g. low) indicating that the burst mode should be deactivated, when the error signal $V_{COMP1}$ exceeds an upper threshold $V_{TH1\_OFF}$, where the upper threshold $V_{TH1\_OFF}$ is greater than the lower threshold $V_{TH1\_ON}$.

For example, as schematically shown in FIG. 6, such a comparison circuit 2120 may comprise a comparator with hysteresis, e.g. implemented with an analog comparator 2122 configured to compare the error signal $V_{COMP1}$ with a threshold value TH1, wherein the threshold value TH1 is selected, e.g. via a selector 2126, as the lower threshold $V_{TH1\_ON}$ or the upper threshold $V_{TH1\_OFF}$ as a function of the signal at the output of the comparator 2122. Considering the connection of the input terminals of the comparator 2122 and the logic levels of the signal BM1 the signal BM1 may also correspond to the inverted version of the comparison signal at the output of the comparator 2122, as schematically shown via an inverter 2124.

In general, the integrated circuit of the PFC control circuit 2112a may also comprise further terminals, such as a terminal configured to receive a current sense signal CS (which may be used to directly control the peak value of the current flowing through the inductance L1) and/or a terminal configured to receive a zero-current detection signal ZCD (which may be used to monitor the demagnetization of the inductance L1 when the PFC converter is operated in the CrCM/TM mode, wherein the driver circuit 2116 starts a new switching cycle/ends the switch-off period $T_{OFF}$ when the current flowing through the inductance L1 reaches zero).

According to various embodiments of the present disclosure, the circuit shown in FIG. 6 is modified in order to take into account also the signal BM_EXT generated by the control circuit 2144/2144a, however without adding an additional pad/pin to the integrated circuit of the PFC control circuit 2112a.

Specifically, in various embodiments, the signal BM_EXT is transmitted via the terminal FB for the feedback signal FB1.

Figure 7:
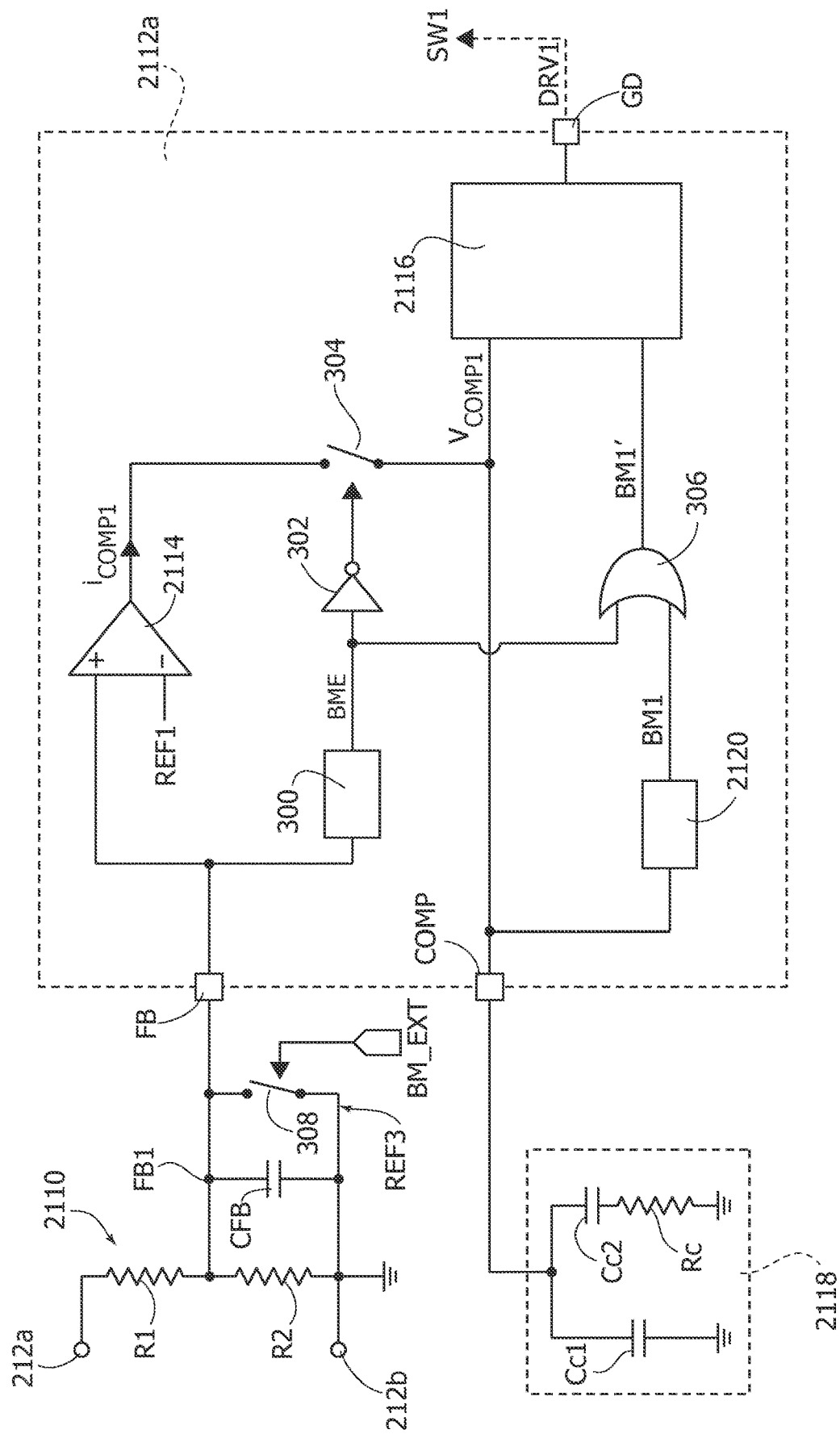
FIG. 7 shows a first embodiment of a control circuit for a PFC boost converter configured to selectively activate a burst mode as a function of an external burst mode signal.

FIG. 7 shows a first embodiment in accordance with the present disclosure.

As described in the foregoing, the feedback signal FB1 is generated via a voltage measurement circuit 2110, e.g. a voltage divider comprising two resistors R1 and R2 connected between the terminals 212a and 212b, i.e. the signal FB1 is indicative of (and preferably proportional to) the voltage Vbus. As shown in FIG. 7, often a capacitor CFB may be connected between the signal FB1 and the terminal 212b which represents a reference voltage, e.g. ground GND.

In various embodiments, the feedback signal FB1 is set via an electronic switch 308, which is external with respect to the integrated circuit of the PFC control circuit 2112a, to a reference voltage REF3. In general, in various embodiments, this reference voltage REF3 corresponds to a voltage or voltage range usually not used by the feedback signal FB1. Specifically, when the voltage $V_{bus}$ is regulated, the feedback signal FB1 should correspond to the reference voltage REF1. Accordingly, in the normal operation mode (DCM, CCM or CrCM), the feedback signal FB1 has usually a value in a range between 80% and 120% of the reference voltage REF3, preferably between 90% and 110%.

Accordingly, in various embodiments, the reference voltage REF3 may be smaller than 80%, preferably between 0 and 50%, more preferably between 0 and 25%, of the voltage REF1 or greater than 120%, preferably between 150% and 300%, of the reference voltage REF1.

For example, the feedback signal FB1 may be set to the reference voltage REF3 by:
- connecting the feedback signal FB1 directly to a reference voltage REF3, such as ground/terminal 212b, or
- varying the resistance R1 and/or R2 of the voltage divider 2110, e.g. by connecting a resistance in parallel with the resistor R1 (thereby increasing the value of the feedback signal FB1) or in parallel with the resistor R2 (thereby decreasing the value of the feedback signal FB1).

Thus, in the embodiment considered, the terminal FB of the integrated circuit of the PFC control circuit 2112a receives either the original feedback signal FB1*i* generated by the measurement circuit 2110, or the reference voltage REF3, having a value usually not used by the feedback signal FB1.

In the embodiment considered, the terminal FB is connected again to the error amplifier 2114. However, the terminal FB is also connected to a detection circuit 300 configured to determine whether the signal BM_EXT has been set. Specifically, as described in the foregoing, when the signal BM_EXT is set, the feedback signal FB1 has a value which is either significantly smaller than the reference voltage REF1 or significantly higher than the reference voltage REF1.

Accordingly, the detection circuit 300 may be configured to set a signal BME when:
- the voltage at the terminal FB/the feedback signal FB1 is smaller than a given first threshold being smaller than REF1; and/or
- the voltage at the terminal FB/the feedback signal FB1 is greater than a given second threshold being greater than REF1.

Thus, the detection circuit 300 may be implemented with a comparator, preferably a comparator with hysteresis.

In general, when the power supply is switched on, the voltage $V_{bus}$, and according the feedback signal FB1 will be (approximately) zero. However, usually this does not represent a problem, when the electronic switch SW1 is opened and the electronic switch SW2 is closed, because in this case, the output capacitor COUT is charged to the peak value of the input voltage $V_{in,DC}$. For example, when the input voltage has a peak value of 230 V and the bus voltage $V_{bus}$ should be regulated to approximately 400 V, the voltage sensor 2110 will generate a feedback signal being still greater than 50% of the reference voltage REF1. Thus, in this case, correct operation of the system may be ensured by using a threshold value $V_{THE\_ON}$ being smaller than 50% of the reference voltage REF1. Accordingly, in general, the threshold value $V_{THE\_ON}$ may be determined as a function of the peak value of the input voltage $V_{in,DC}$, the requested bus voltage $V_{bus}$ and the reference voltage REF1.

In various embodiments, the detection circuit 300 may also be disabled during the start-up phase of the stage 210. For example, the control circuit 2112a may comprise a timer circuit, which maintains the detection circuit 300 disabled for a given time-interval. Alternatively, the control circuit 2112a may comprise a separate start circuit configured to manage the switching activity of the stage 210 during a start-up phase, e.g. while the voltage $V_{bus}$ is smaller than a given threshold value.

Finally, insofar as the voltage at the terminal FB varies fast when the electronic switch 308 switches, the detection circuit 300 may also comprise an edge detector, e.g. configured to determine whether the signal FB1 at the terminal FB varies more than a given amount in a certain time interval.

Figure 8:
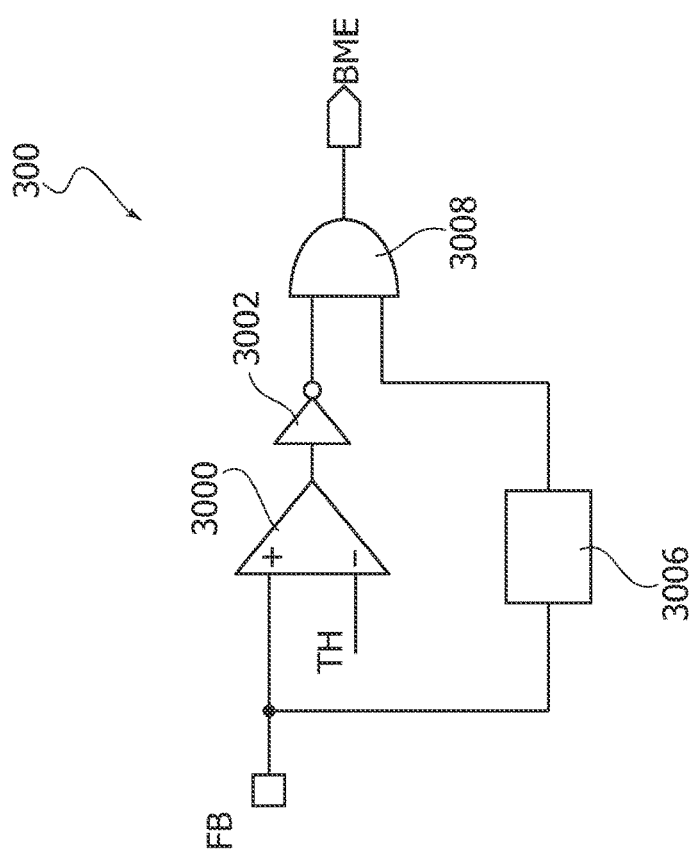
FIGS. 8 and 9 show embodiments of an external burst mode detection circuit for the control circuit of FIG. 7.

For example, FIG. 8 shows an embodiment of the detection circuit 300, wherein the reference voltage REF3 is smaller than REF1, e.g. because the switch 308 is configured to connect the terminal FB to the terminal 212b/ground GND (see FIG. 7).

In the embodiment considered, the detection circuit 300 comprises an analog comparator 3000 configured to compare the voltage at the terminal FB/feedback signal FB1 with a threshold value TH, wherein the threshold value TH is selected, e.g. via a selector 3004, as a lower threshold $V_{THE\_ON}$ or an upper threshold $V_{THE\_OFF}$ as a function of the signal at the output of the comparator 3000. Considering the connection of the input terminals of the comparator 3000 and the logic levels of the signal BME the signal BME may also correspond to the inverted version of the comparison signal at the output of the comparator 3000, as schematically shown via an inverter 3002.

For example, in various embodiments, the threshold $V_{THE\_ON}$ may be smaller than 80%, preferably between 1% and 50%, more preferably between 5% and 25%, of the reference voltage REF1. Similarly, the threshold $V_{THE\_OFF}$ may the same range, and may either correspond to the threshold $V_{THE\_ON}$, or preferably is greater than the threshold $V_{THE\_ON}$.

Accordingly, in the embodiment considered, the signal BME is set (e.g. to high) when the feedback signal FB1 differs significantly form the reference voltage REF1, which indicates that the signal BM_EXT is set.

Figure 9:
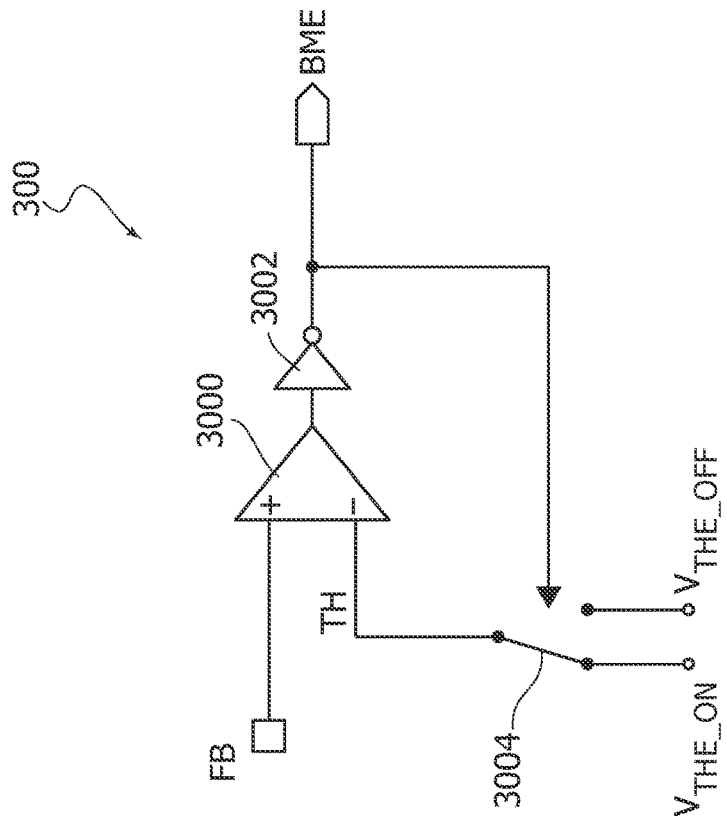

FIG. 9 shows a modified embodiment, wherein the detection circuit comprises also an edge detection circuit 3006.

For example, the edge detection circuit 3006 may be configured to:
  set an output to a first logic level, when the signal FB1 at the terminal FB decreases more than a given amount in a certain time interval; and
  set an output to a second logic level, when the signal FB1 at the terminal FB increases more than a given amount in a certain time interval.

Accordingly, in this case, the signal BME may be generated by combining at a logic gate 3008, e.g. an AND gate, the signals at the output of the comparator 3000 (which may be a comparator with or without hysteresis) with the signal at the output of the edge detection circuit 3006.

As described in the foregoing, in addition or as alternative to the edge detection circuit 3006 may also be used other circuits, such as a timer circuit, in order to correctly manage the start-up phase of the stage 210.

In the embodiment shown in FIG. 7, the signal BME is thus provided to the driver circuit 2116 in order to deactivate the switching activity of the boost converter 210 in response to the signal BME.

Specifically, when also using the comparator circuit 2120 (detection of internal burst mode), the signal BME generated by the detection circuit 2120 and the signal BM1 generated by the comparison circuit 2120 may be combined at a logic gate 306, such as an OR gate, in order to generate a combined signal BM1', which thus signals to the driver circuit 2116 that the switching activity should be stopped because of a small load of the converter 210 or because the converter 214 has activated the burst mode.

The inventors have observed, that the switching of the voltage at the feedback terminal FB may also influence the regulation of the control circuit via the error amplifier 2114 and the compensation/feedback network 2118. In fact, when switching the voltage at the feedback terminal FB to a significantly different value compared to the reference voltage REF1, also the error signal $V_{COMP1}$ would vary. Accordingly, when resuming the switching activity when the signal BM1' changes again its logic level, the driver circuit 2116 would start with an incorrect error signal $V_{COMP1}$.

Accordingly, in various embodiments, the error signal $V_{COMP1}$ is stored, when the signal BME is set, i.e. when the external burst mode is activated, and the stored error signal $V_{COMP1}$ is reused, when the signal BME is reset, i.e. when the external burst mode is deactivated.

For example, in the embodiment shown in FIG. 7, the output of the error amplifier 2114 is now connected via an electronic switch 304 to the terminal COMP, i.e. the output of the error amplifier 2114 which usually provides a current $i_{COMP1}$ is connected selectively via the electronic switch 304 to the terminal COMP and the driver circuit receives the voltage $V_{COMP1}$ at the terminal COMP.

In fact, as described in the foregoing, the network 2118 usually comprises a capacitor (Cc1 and/or Cc2), which already implement an analog storage element. Accordingly, while the electronic switch 304 is closed, the error signal $V_{COMP1}$ at the terminal COMP/network 2118 is varied. Conversely, when the electronic switch 304 is opened, the terminal COMP/network 2118 provides the stored value $V_{COMP1}$.

Accordingly, in the embodiments considered, the control circuit 2112a is configured to:
  open the electronic switch 304 when the signal BME has the first logic level (e.g. high); and
  close the electronic switch 304 when the signal BME has the second logic level (e.g. low).

Figure 1:
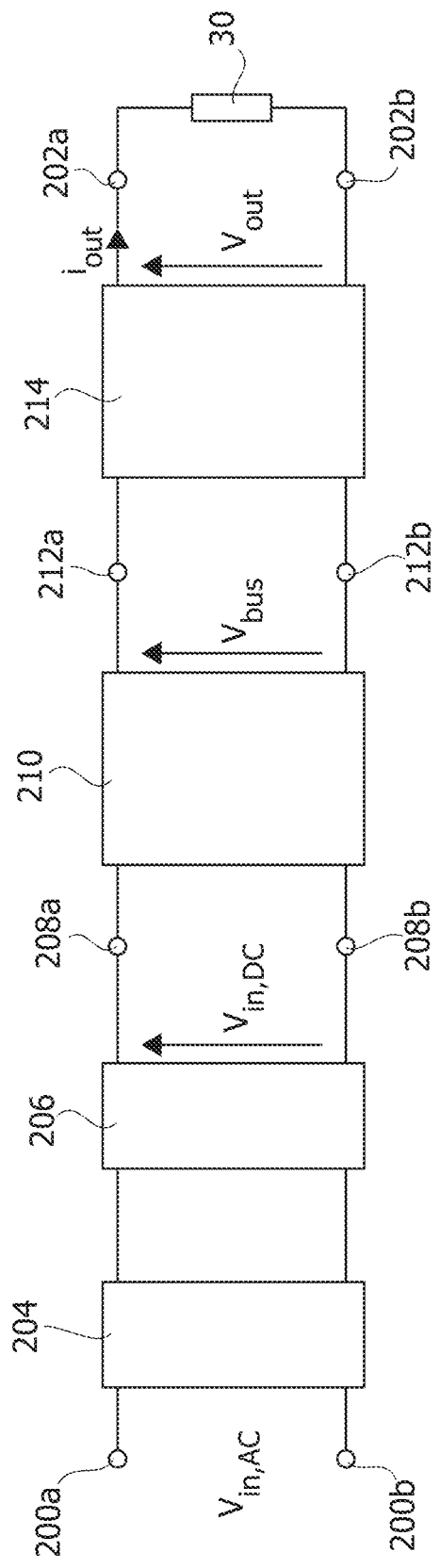
FIG. 1 shows a first example of a two-stage power supply comprising a PFC converter stage and a DC/DC converter stage.
Figure 2A:
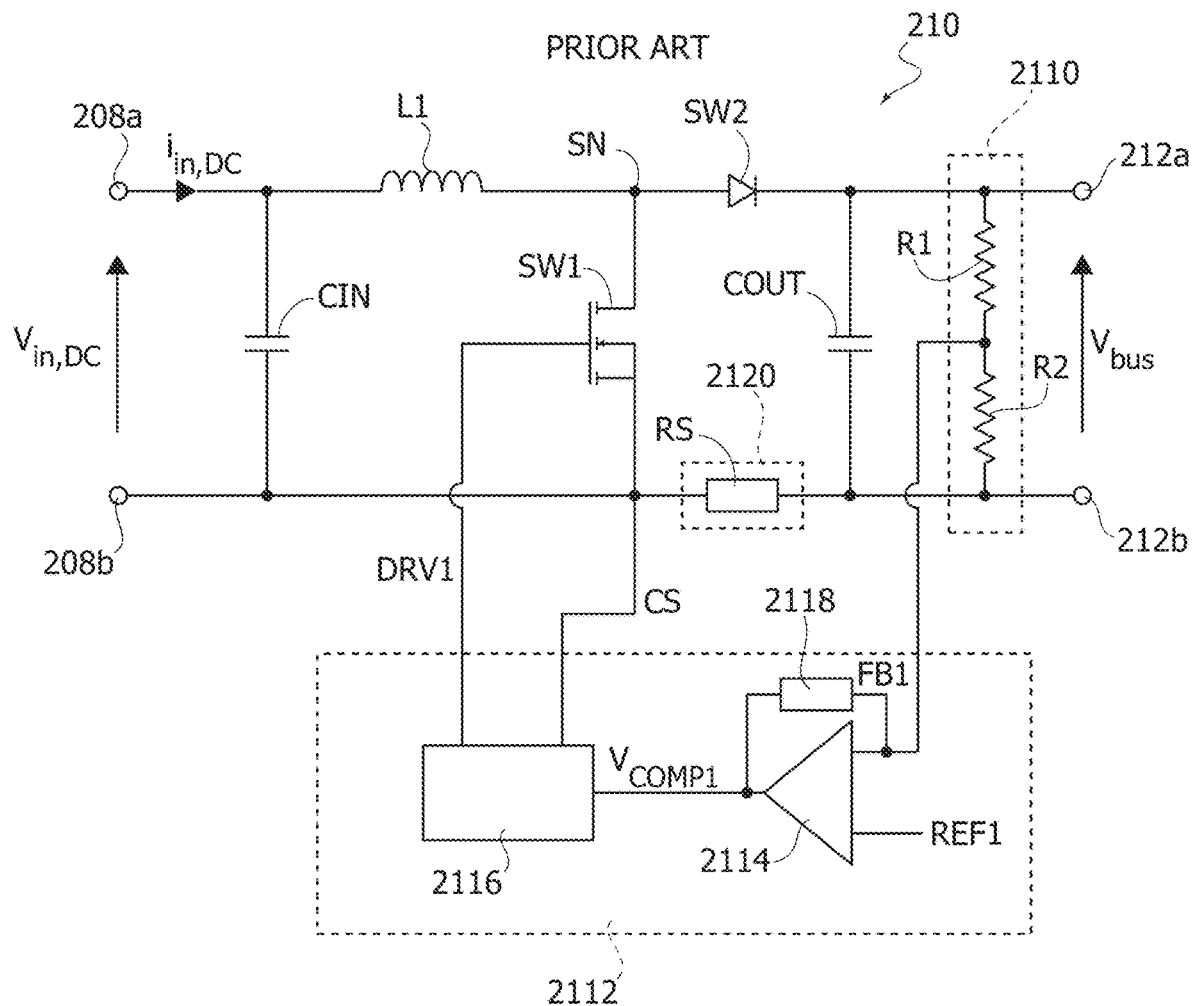
FIGS. 2A and 2B show an example of a PFC boost converter.
Figure 2B:
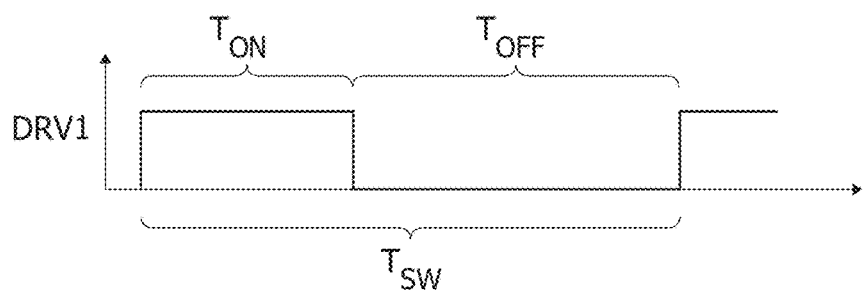
Figure 3:
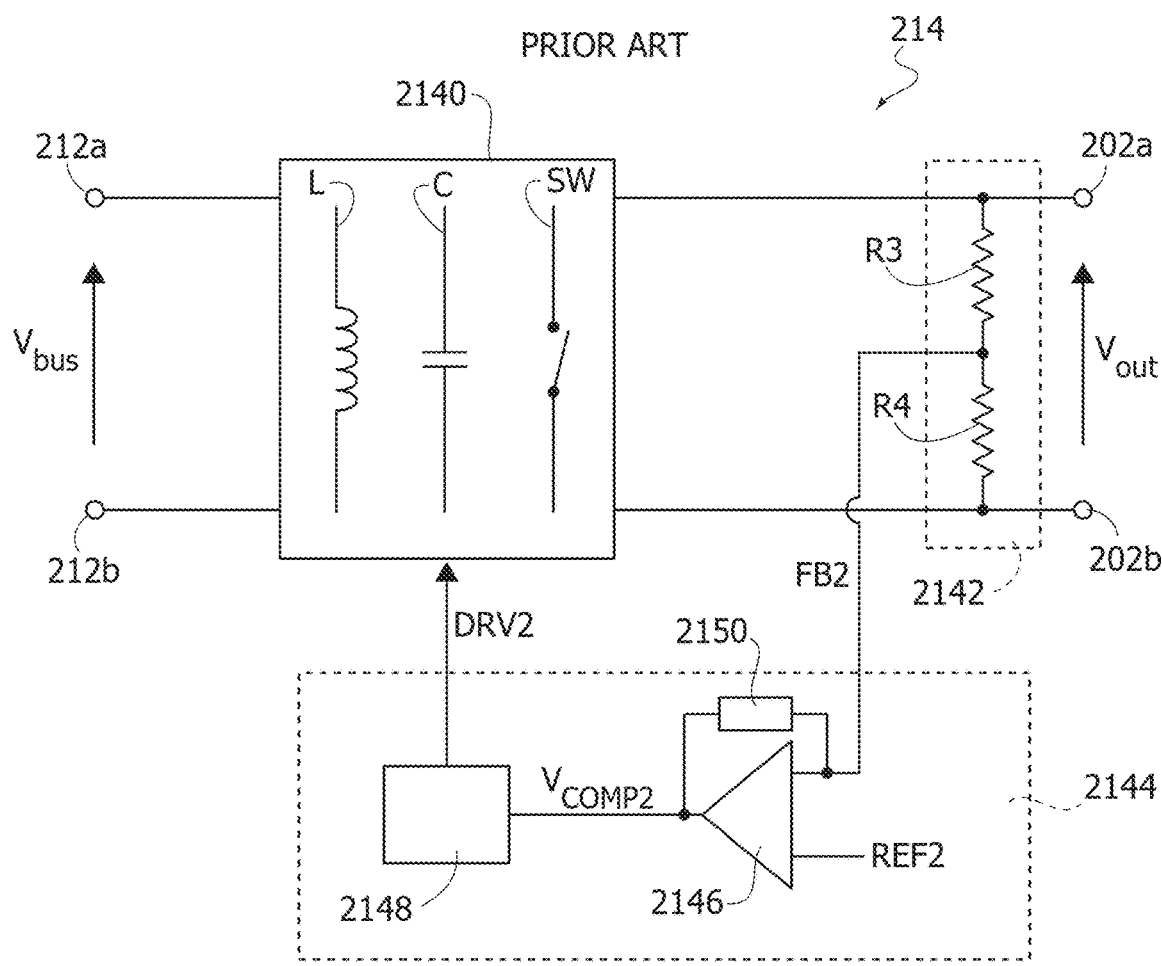
FIG. 3 shows an example of a generic DC/DC electronic converter.
Figure 4:
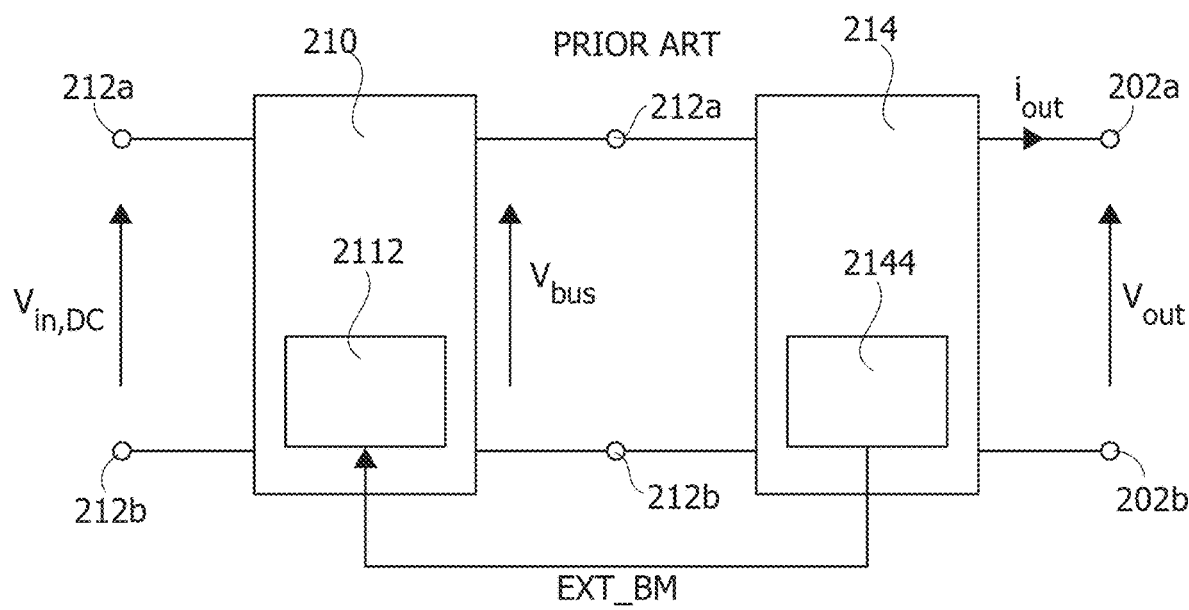
FIG. 4 shows a second example of a two-stage power supply.

For example, for this purpose the control signal of the electronic switch 304 may correspond to the inverted version of the signal BME, as schematically shown in FIG. 1 via an inverter 302.

In various embodiments, the switch 304 may also form part of a more complex sample-and-hold circuit, e.g. a current sample-and-hold circuit for the current $i_{COMP1}$ or a voltage sample-and-hold circuit for the voltage $V_{COMP1}$.

Accordingly, in the embodiment shown in FIG. 7, the electronic switch 308, which is external to the integrated circuit of the control circuit 2112a, acts as pull down and lowers the voltage at the terminal FB (which in the regulated condition should correspond approximately to REF1), when the signal BM_EXT is set. For example, the signal BM_EXT may be connected to a gate terminal or base terminal of a respective FET or bipolar transistor 308.

In the embodiment considered, the detection circuit 300 monitors the voltage at the terminal FB and generates a signal BME indicating whether the external burst mode has been activated. For example, in various embodiments, the detection circuit 300 sets the signal BME to a first logic level (indicating that the external burst mode was activated) when the voltage is lower than a predetermined threshold TH=$V_{THE\_ON}$. Conversely, in various embodiments, the detection circuit 300 sets the signal BME to a second logic level (indicating that the external burst mode was deactivated) when the voltage is greater than a predetermined threshold TH=$V_{THE\_OFF}$. Specifically, in the embodiment considered, the threshold TH is smaller than the reference voltage REF1, and $V_{THE\_OFF}$ is preferably greater than $V_{THE\_ON}$.

In various embodiments, the sample-and-hold circuit/electronic switch 304 is used to store the error signal $V_{COMP1}$ when the external burst mode is activated, thereby avoiding that the voltage $V_{COMP1}$ at the terminal COMP changes. For example, in FIG. 7, the electronic switch 304 is configured to simply put the output of the error amplifier 2114 in high impedance in order to avoid alteration of the voltage value $V_{COMP1}$ at the terminal COMP.

Figure 10:
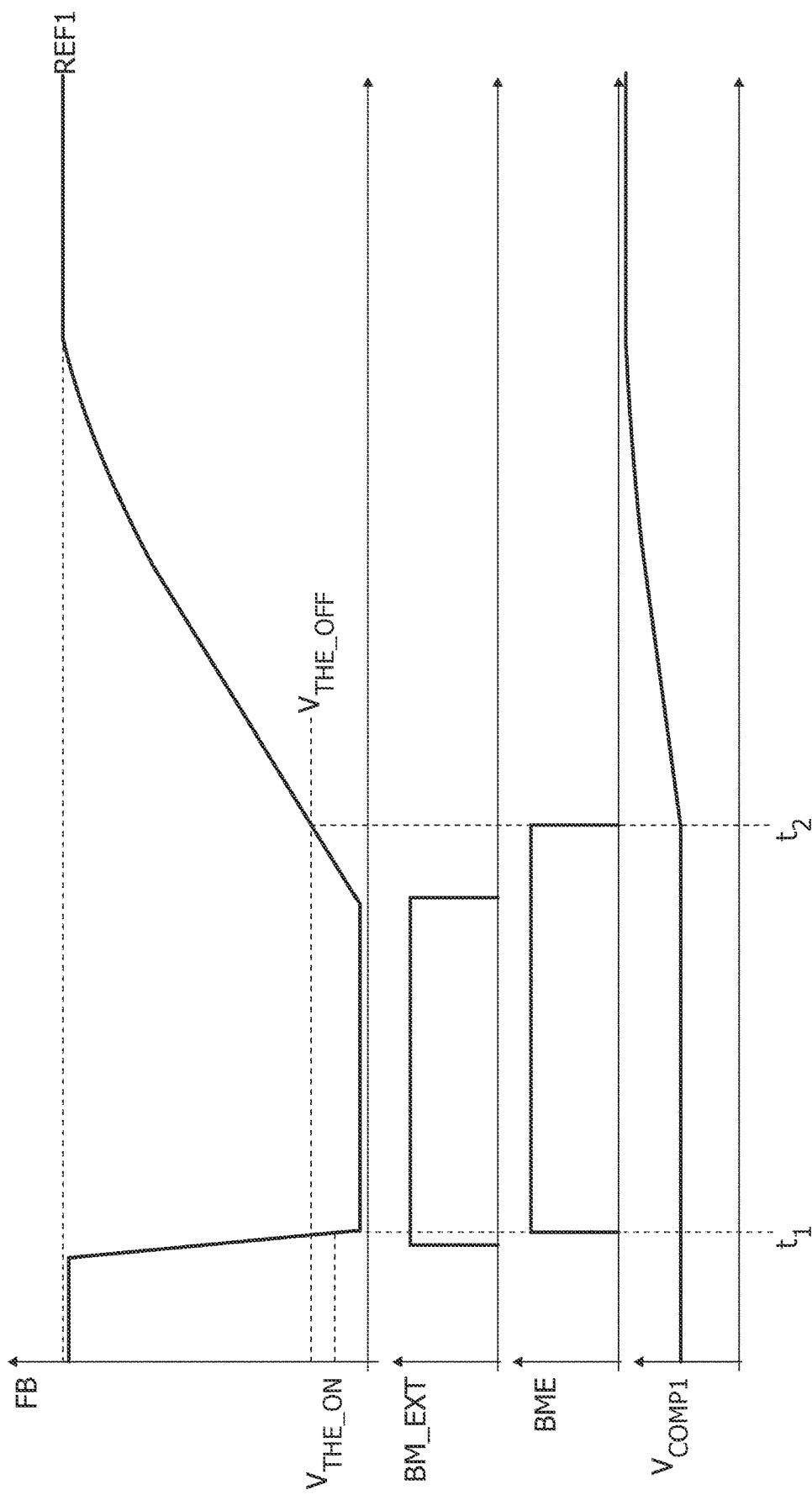
FIG. 10 shows waveforms of the operation of the control circuit of FIG. 7.

Accordingly, in the embodiment considered and as also shown in FIG. 10, when the signal BM_EXT is low, the electronic switch 308 is opened, and the control circuit 2112a regulates the boost converter as a function of the feedback signal FB1, e.g. by using a CCM, DCM or CrCM mode.

When the signal BM_EXT is set to high at an instant $t_1$, the electronic switch 308 pulls down and brings the voltage at the terminal FB to a value close to the ground value. The detection circuit 300 within the integrated circuit of the control circuit 2112a detects that the voltage at the terminal FB falls below the threshold $V_{THE\_ON}$ and sets the signal BME to high. This signal BME signals to the driver circuit 2116 that the switching activity should be interrupted. Moreover, this signal BME is used to open the electronic switch 304, thereby maintaining the previous value of the error signal $V_{COMP1}$. When the signal BM_EXT is set to low at an instant $t_2$, the electronic switch 308 is opened and the voltage at the terminal FB rises again (see capacitance CFB). As soon as the voltage at the terminal FB exceeds the threshold $V_{THE\_OFF}$, the detection circuit 300 sets the signal BME to low and the driver circuit 2116 restarts the switching activity.

However, as shown in FIG. 10, while the voltage at the terminal FB may vary fast when the electronic switch 308 is closed (e.g. signal BM_EXT is set to high), the voltage at the terminal FB may vary slower when the electronic switch 308 is opened (e.g. signal BM_EXT is set to low). For example, as described in the foregoing, the terminal FB may have associated a capacitance CFB (which may also be a filter capacitor). For example, this capacitance CFB may be in a range of 10 to 100 nF. Accordingly, the measurement circuit 2110 has to recharge this capacitance CFB. For example, when using a voltage divider R1/R2, the charge current is limited by the resistance of the resistors R1/R2. However, these resistors are often large in order to reduce electric losses. Accordingly, the rise time of the terminal FB, when the signal BM_EXT is set to low, depends on the resistors R1 and R2, and the capacitance CFB, which causes a delay when the switching starts again.

Moreover, this also implies that the signals at the input of the error amplifier 2114 are rather different when the electronic switch 304 is opened, e.g. the error amplifier 2114 will provide a large current $i_{COMP1}$, which may render the following regulation rather slow and complex from a stability point of view. For example, even when storing the value $V_{COMP}$ this value is likely varied due to the incorrect voltage at the feedback pin FB.

The inventors have observed that these instabilities may be avoided or at least reduced, by delaying the activation/regulation of the error amplifier 2114, e.g. by maintaining opened the electronic switch 304 until the voltage at the terminal FB has reached again substantially the voltage REF1.

Figure 11:
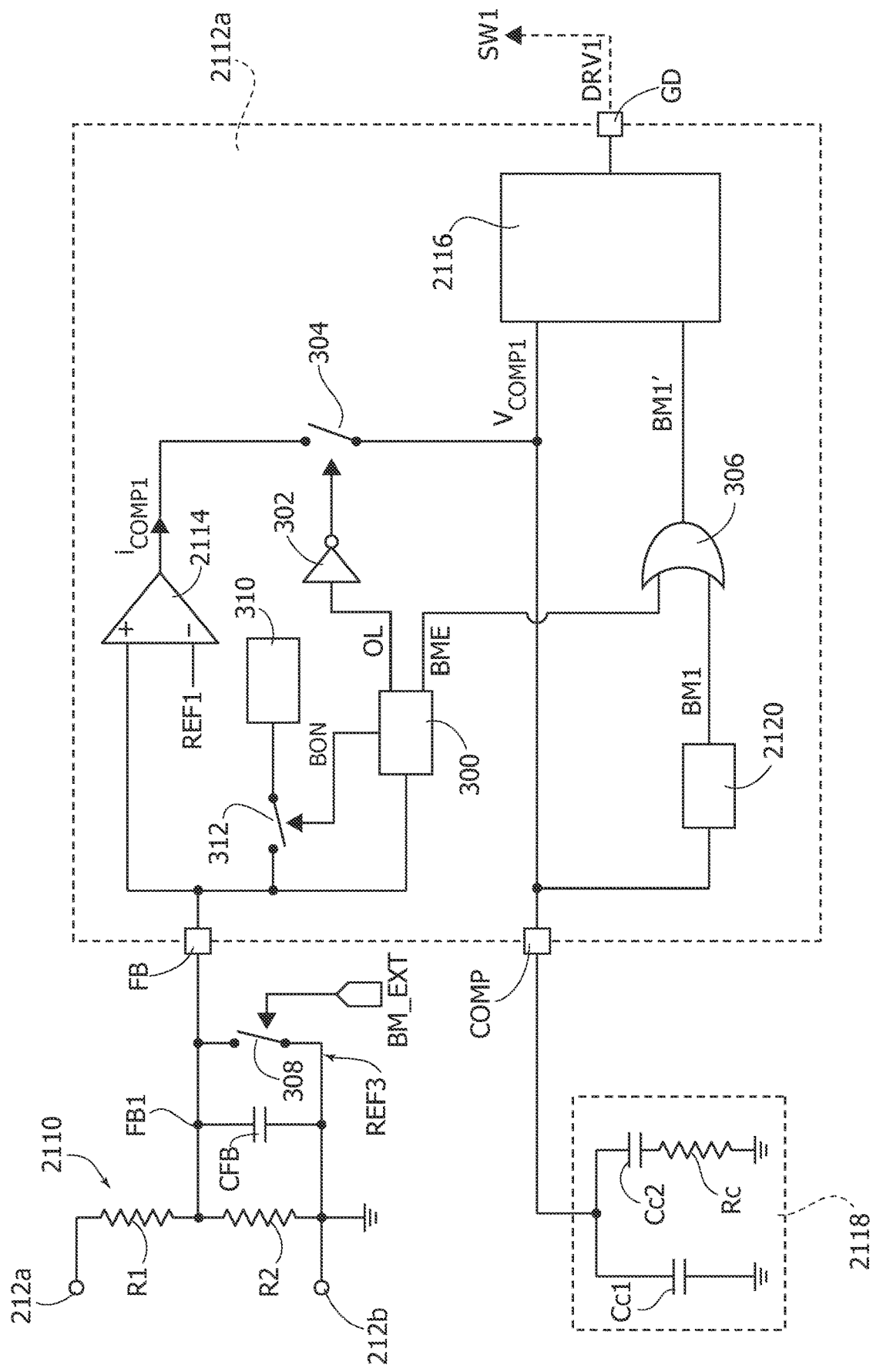
FIG. 11 shows a second embodiment of a control circuit for a PFC boost converter configured to selectively activate a burst mode as a function of an external burst mode signal.
Figure 12:
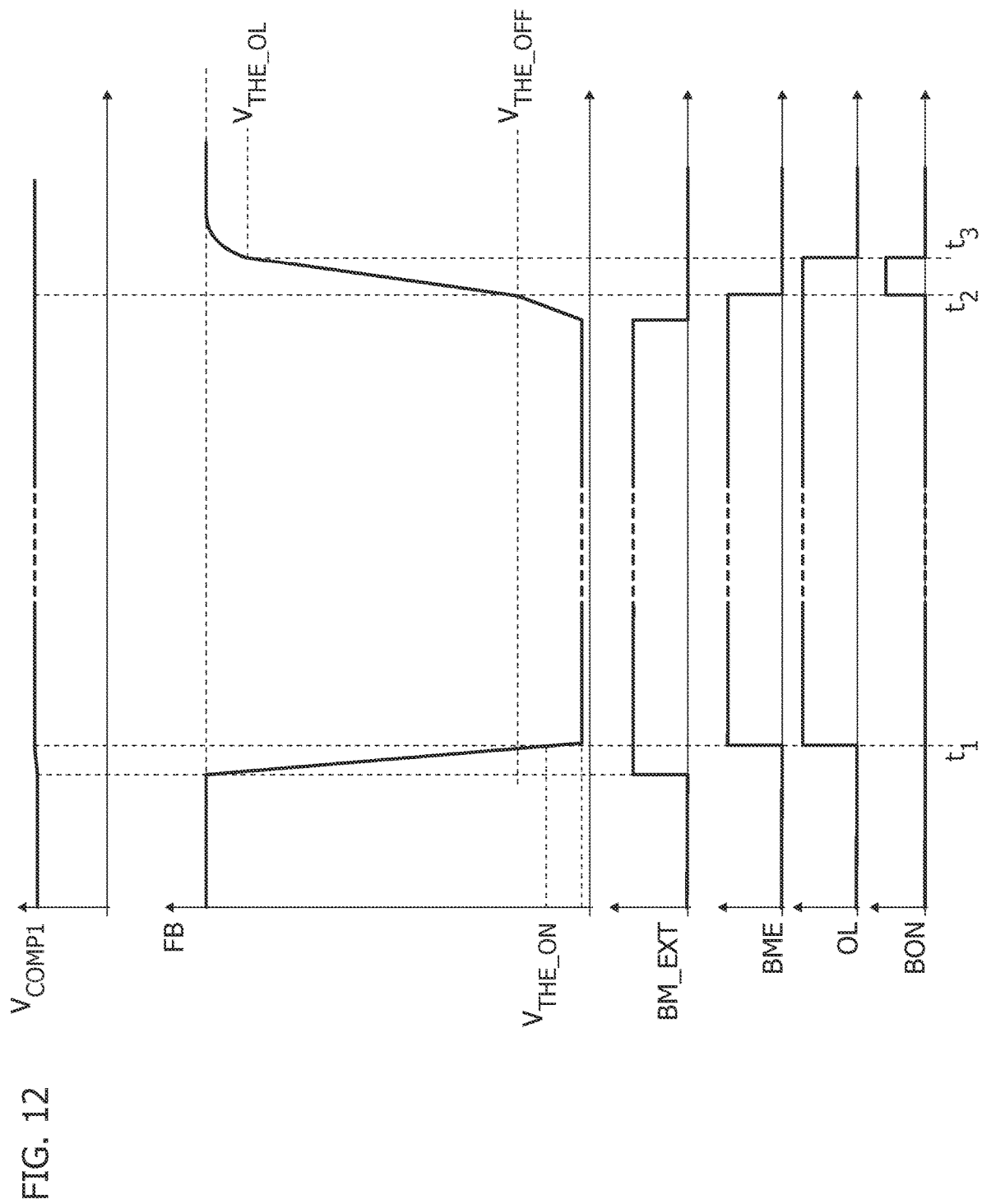
FIG. 12 shows waveforms of the operation of the control circuit of FIG. 12.

Specifically, FIGS. 11 and 12 show an embodiment of the control circuit 2112a, wherein the detection circuit 300 is configured to generate a signal OL in addition to the signal BME. Moreover, the error amplifier 2114 is now enabled via the signal OL, e.g. by controlling the switching of the electronic switch 304 (or a respective sample-and-hold circuit).

Substantially, in the embodiment considered, the detection circuit 300 is configured to set the signal BME as described in the foregoing, e.g.:
- to a first logic level (indicating that the external burst mode was activated, e.g. high) when the voltage at the terminal FB falls below a predetermined threshold $V_{THE\_ON}$; and
- to a second logic level (indicating that the external burst mode was deactivated, e.g. low) when the voltage at the terminal FB exceeds a predetermined threshold $V_{THE\_OFF}$.

Conversely, in the embodiment considered, the detection circuit 300 is configured to set the signal OL:
- to a first logic level (e.g. high) when the voltage at the terminal FB falls below the threshold $V_{THE\_ON}$, thereby disabling the error amplifier 2114, e.g. by opening the electronic switch 304; and
- to a second logic level (e.g. low) when the voltage at the terminal FB exceeds a further threshold $V_{THE\_OL}$ (being greater than the threshold $V_{THE\_OFF}$; and preferably between 90% and 100% of the reference voltage REF1), thereby enabling the error amplifier 2114, e.g. closing the electronic switch 304.

Accordingly, in the embodiment considered, the signal BME is set to low when the voltage at the terminal FB exceeds the threshold $V_{THE\_OFF}$, thereby activating the driver circuit 2116, and the error amplifier 2114 is activated/enabled later when the voltage at the terminal FB reaches the further threshold $V_{THE\_OL}$. Substantially, this implies that the driver circuit 2116 operates with an open loop control during the instant $t_2$ when the voltage at the terminal FB exceeds the threshold $V_{THE\_OFF}$ and the instant $t_3$ when the voltage at the terminal FB reaches a further threshold $V_{THE\_OL}$.

Moreover, in order to reduce the time during which the driver circuit 2116 operates with an open loop control, in various embodiments, the control circuit 2112a is configured to increase the charging of the capacitance CFB. For example, in various embodiments, the integrated circuit of the control circuit 2112a comprises a voltage or current generator 310 configured to selectively apply to the terminal FB a voltage or a current. For example, in FIG. 11 is shown schematically an electronic switch 312 configured to enable the voltage or current generator 310 as a function of a signal BON.

Specifically, in various embodiments, the detection circuit 300 is configured to set the signal BON:
- to a first logic level (e.g. high) when the signal BME has the respective second logic level (external burst mode deactivated) and the signal OL has the respective first logic level (open loop control activated), thereby enabling the voltage or current generator 310, which reduces the charge time of the capacitor CFB; and
- to a second logic level (e.g. low) when the signal BME has the respective first logic level (external burst mode activated) or the signal OL has the respective second logic level (open loop control deactivated), thereby disabling the voltage or current generator 310.

Accordingly, in various embodiments, the signal BON may be generated by the detection circuit 300, e.g. via a combinational logic circuit, such as an XOR gate, as a function of the signal OL and the signal BME.

Accordingly, in various embodiments, the control circuit 2112a may be configured to reduce the time required to reactivate the switching activity (by using an open loop control) and to reduce the time required to recharge the capacitance associated with the terminal FB (via the voltage or current generator 310), thereby reducing the alteration of the error signal $V_{COMP1}$ at the terminal COMP.

Figure 13:
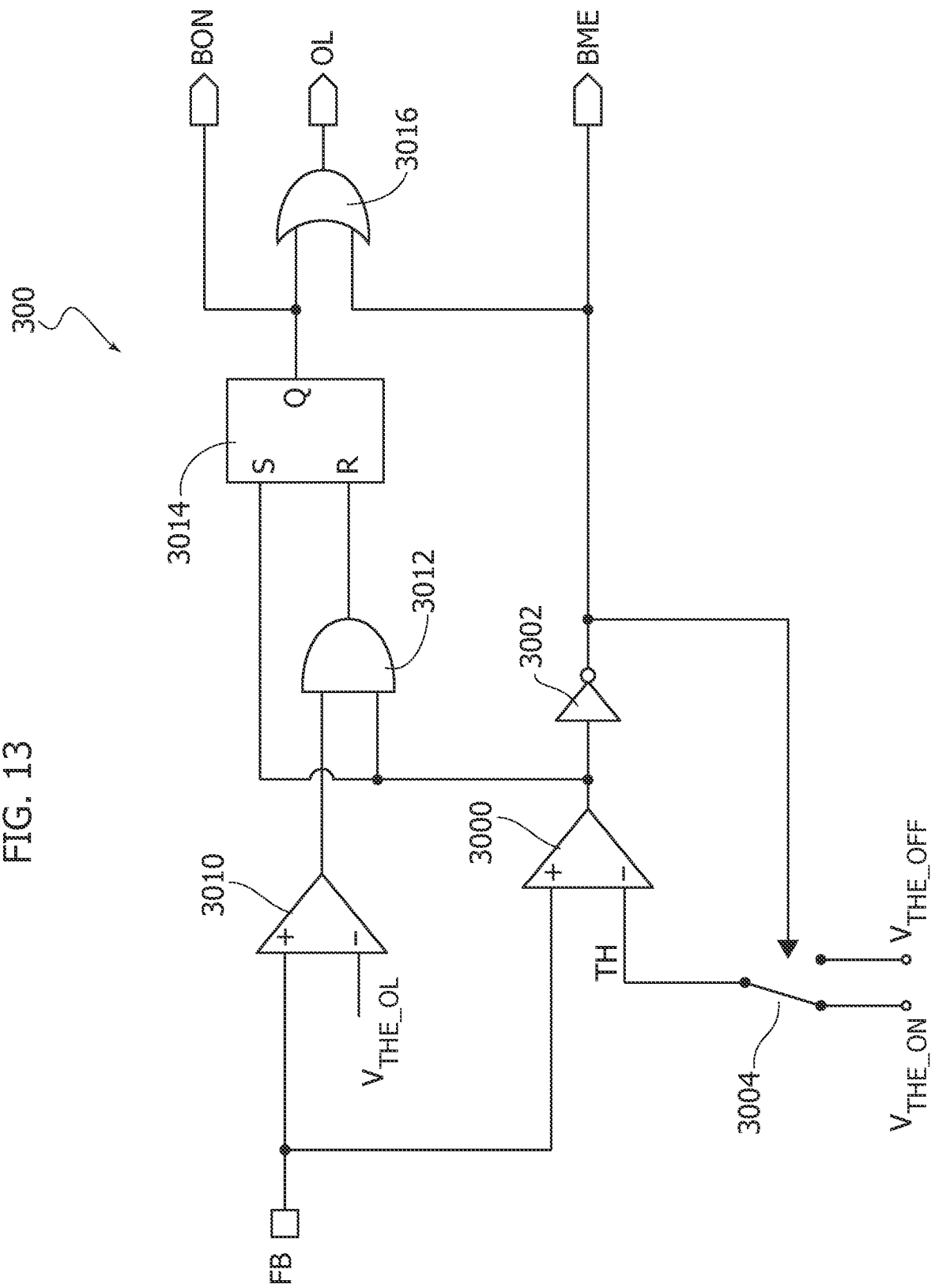
FIG. 13 shows an embodiment of an external burst mode detection circuit for the control circuit of FIG. 12.

FIG. 13 shows an embodiment of the detection circuit 300, which is essentially based on the embodiment shown in FIG. 8, but also the embodiment shown in FIG. 9 could be used.

Accordingly, in the embodiment considered, the detection circuit 300 comprises again a comparator, such as a comparator with hysteresis, e.g. implemented with the comparator 3000, the inverter 3002 and the electronic switch 3004, in order to generate the signal BME by comparing the voltage at the terminal FB with the thresholds $V_{THE\_ON}$ and $V_{THE\_OFF}$.

In the embodiment considered, the inverted version of the signal BME, e.g. at the output of the comparator 3000, is used to set a set-reset latch 3014, i.e. the output of the latch 3014 is set to high when the voltage at the terminal FB exceeds the threshold $V_{THE\_OFF}$.

In the embodiment considered, the detection circuit 300 comprises moreover a further comparator 3010 configured to compare the voltage at the terminal FB with the threshold $V_{THE\_OL}$, thereby indicating whether the voltage at the terminal FB is greater than the threshold $V_{THE\_OL}$.

Accordingly, in the embodiment considered, the signal at the output of the comparator 3010 may be used to reset the latch 3014. For example, in the embodiment considered, an optional combinational logic circuit, such as an AND gate 3012, is used to generate the reset signal for the latch 3014 as a function of the signal at the output of the comparator 3010 and the signal provided to the set input of the latch (corresponding to the inverted version of the signal BME).

Accordingly, in the embodiment considered, the comparators 3000 and 3010, the latch 3014 and the optional combinational logic circuit 3012 are configured to generate the signal BON, which is set to high between the instant when the voltage at the terminal FB exceed the threshold $V_{THE\_OFF}$ and the instant when the voltage at the terminal FB reaches the threshold $V_{THE\_OL}$.

Accordingly, in the embodiment considered, the signal OL may be generated via a combinational logic circuit 3016, such as an OR gate, receiving at input the signal BON and the signal BME.

As described in the foregoing, the signal OL is used to enable the error amplifier 2114. For example, as described in the foregoing, the signal OL may be used to selectively close the electronic switch 304.

Figure 14:
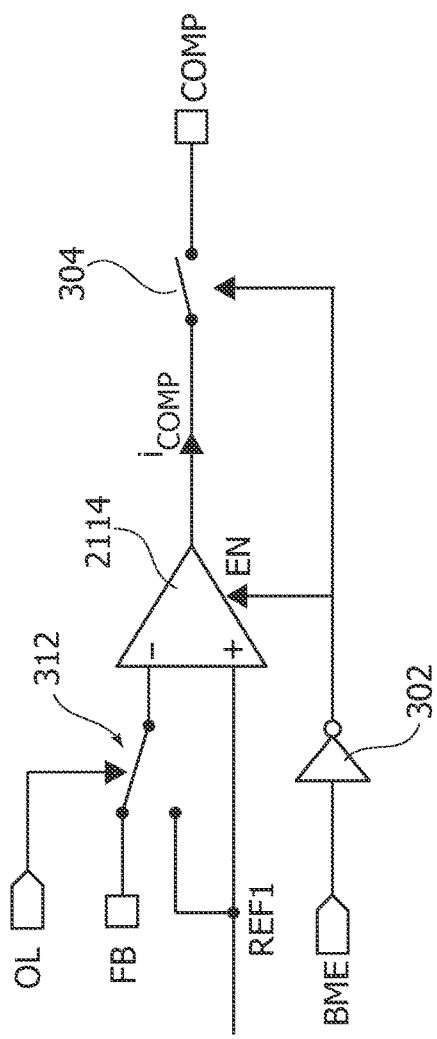
FIGS. 14, 15 and 16 show implementation details of the control circuit of FIG. 12.

FIG. 14 shows in this respect alternative embodiments for enabling the error amplifier 2114. Specifically, in the embodiment considered, the output of the error amplifier 2114 may be enabled via at least one of:
the electronic switch 304 connected between the output of the error amplifier 2114 and the terminal COMP;
an enable terminal of the error amplifier itself; or
via an electronic switch 312 configured to provide to the input of the error amplifier 2114 either the voltage at the terminal FB or the reference voltage REF1.

Accordingly, in various embodiments, at least one of the electronic switch 304, the enable terminal of the error amplifier 2114 or the electronic switch 312 is driven via the signal OL.

For example, in the embodiment shown in FIG. 14, the enable terminal of the error amplifier 2114 and/or the electronic switch 304 is driven via the signal BME, and the electronic switch 312 is driven via the signal OL.

Accordingly, in various embodiments, the detection circuit 300 is configured to monitor the voltage at the terminal FB and decides the EBM (External Burst Mode) status by means of the assertion of the signal BME. This signal is used (optionally in combination with the signal BM1) to stop the switching activity of the driver circuit 2116. In various embodiments, the detection circuit 300 also generates the signal OL. For example, in FIG. 14 the signal OL is used to sets both inputs of the error amplifier 2114 to the reference voltage REF1, whereby the main loop of the first stage 210 is open. Conversely, the signal BME may be used to physically places the terminal COMP in the high impedance condition by opening the electronic switch 304 and/or to disable the error amplifier 2114. This allows the voltage value $V_{COMP1}$ at the terminal COMP to remain almost constant for as long as the external burst mode is activated.

In general, the choice to close the electronic switch 304 and/or enable the error amplifier 2114 first and then switch the input terminals of the error amplifier 2114 is a design choice, which can improve the behavior of the terminal COMP by avoiding small voltage jumps on it. For example, such variations may occur due to the fact that in the phase in which the terminal FB goes down once the signal BM_EXT is set, there may be a reaction time of the detection circuit 300 in which the error amplifier 2114 has unbalanced inputs, possibly resulting in a variation of the voltage $V_{COMP1}$.

As described in the foregoing, the signal BON is used to enable the voltage or current generator 310.

Figure 15:
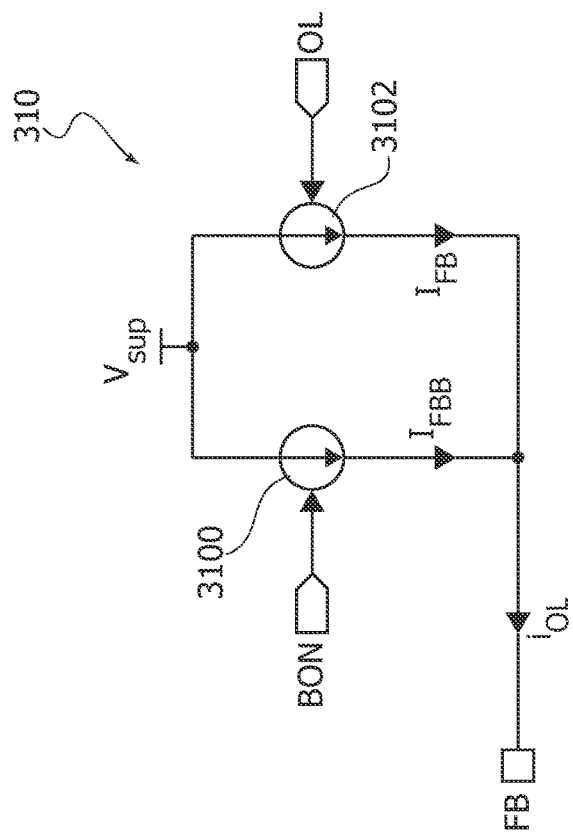

For example, FIG. 15 shows an embodiment of a current generator 310 configured to provide a current $i_{OL}$ to the terminal FB as a function of the signal BON.

Specifically, in the embodiment considered, the current generator 310 comprises a current generator 3100 configured to provide a current $I_{FBB}$, which is selectively enabled via the signal BON, i.e. $i_{OL}=I_{FBB}$ when the signal BON has the first logic level (e.g. high) or $i_{OL}=0$ when the signal BON has the second logic level (e.g. low).

Figure 16:
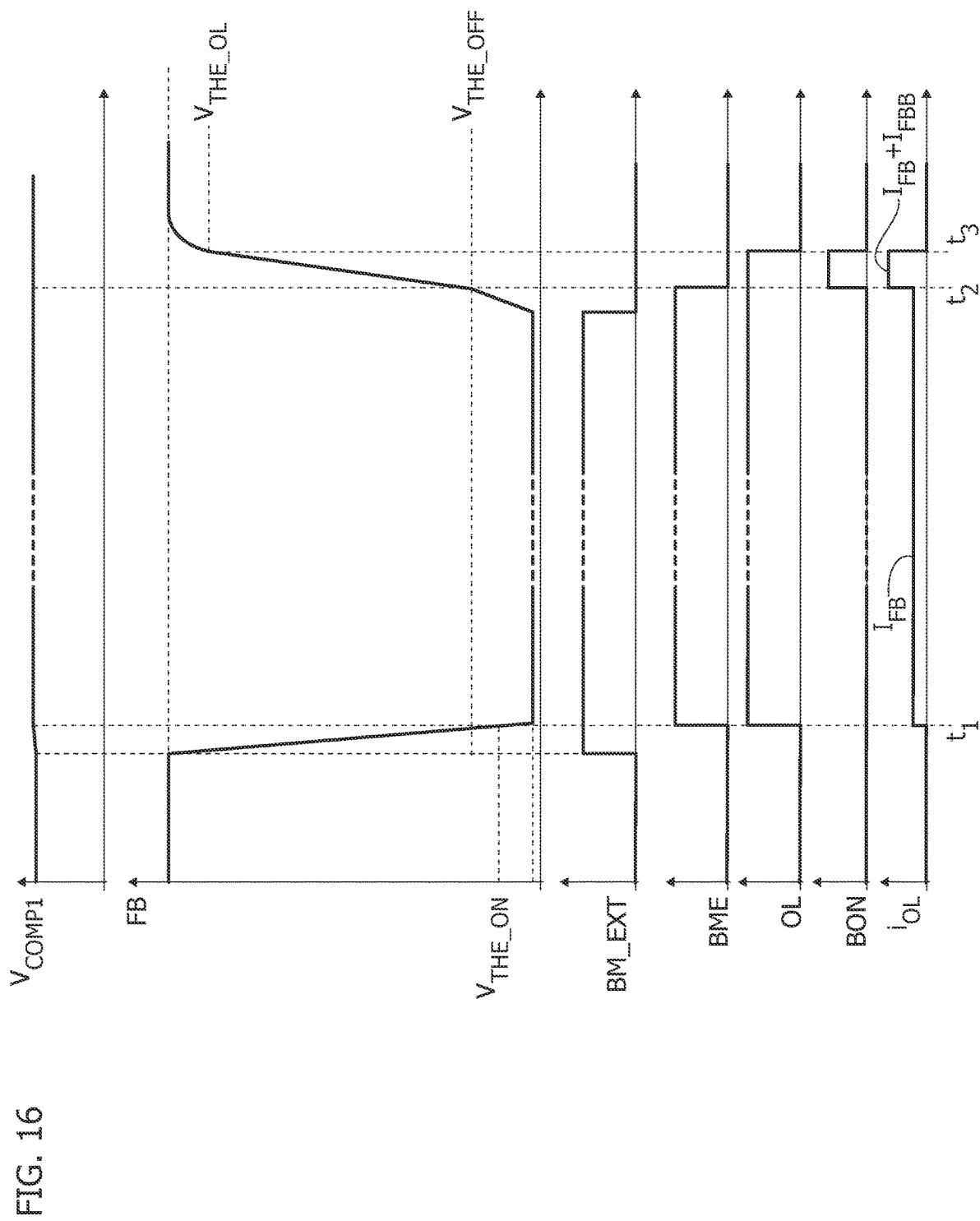

In various embodiments, the current generator 310 comprises a further current generator 3102 configured to provide a current $I_{FB}$, which is selectively enabled via the signal OL. Accordingly, in the embodiment considered and as also shown in FIG. 16, the current $i_{OL}$ corresponds to:
zero (0) when the signal BON has the respective second logic level (e.g. low) and the signal OL has the respective second logic level (e.g. low);
$I_{FB}$ when the signal BON has the respective second logic level (e.g. low) and the signal OL has the respective first logic level (e.g. high); and
$I_{FB}+I_{FBB}$ when the signal BON has the respective first logic level (e.g. high) and the signal OL has the respective first logic level (e.g. high).

Accordingly, in various embodiments, the two current generators 3100 and 3102 connected to the terminal FB are normally switched off and are suitably driven during the external burst mode state input and output phase. In particular, in various embodiments, the current generator 3102 may be switched on for as long as the system is in the external burst mode state (signal OL is set), while the current generator 3100 is on for a short time (between the instants $t_2$ and $t_3$, when the signal BON is set) in order to speed up the rise of the voltage at the terminal FB until the threshold $V_{THE\_OL}$ (which may also correspond to the reference voltage REF1) is reached.

Accordingly, when the second stage 214 activates the burst mode, the signal BM_EXT is set. In response to the signal BM_EXT, the electronic switch 308 is closed and this causes the capacitance CFB to discharge and consequently the voltage at the terminal FB becomes close to the ground value. As soon as the voltage at the terminal FB falls below the threshold $V_{THE\_ON}$, the detection circuit 300 sets the signals BME and OL (e.g. to high). Specifically, the driver circuit 2116 interrupts the switching activity in response to the signal BME and the error amplifier 2114 is disabled/deactivated in response to the signal OL.

Specifically, in various embodiments, the signal BME may be used to open the electronic switch 304, thereby configuring the terminal COMP in high impedance and its voltage value $V_{COMP1}$ remains stored in the capacitance(s) of the network 2118, and the signal OL may be used to set (via the electronic switch 312) the input terminals of the error amplifier to the reference voltage REF1.

In various embodiments, the signal OL may also turn on the current generator 3102. This optional current should be small enough in order to not affect excessively the efficiency at low system loads, because this current is active for as long as the system is in external burst mode state and may be drawn from the PFC controller power supply. This optional current $I_{FB}$ may be useful to accelerate the first phase of voltage rise at the terminal FB (before the instant $t_2$) when the switch 308 is opened.

Accordingly, when the signal BM_EXT is reset, the electronic switch 308 is opened and the optional current $I_{FB}$ may charge the capacitance CFB (in addition to the current flowing through the voltage sensor 2110 from the voltage $V_{Bus}$). When the voltage at the terminal FB reaches the threshold $V_{THE\_OFF}$, the detection circuit 300 resets the signal BME (e.g. to low) and the driver circuit 2116 resumes the switching activity. In various embodiments, the error amplifier 2114 remains still deactivated. Specifically, in various embodiments, while the electronic switch 304 may be closed in response to the variation of the signal BME, thereby connecting the output of the error amplifier 2114 to the terminal COMP and/or the error amplifier 2114 may be enabled (which simply render the error amplifier 2114 ready to operate, but reduces power consumption during the instants $t_1$ and $t_2$), both input terminals of the error amplifier 2114 may still be connected to the reference voltage REF1, i.e. the error amplifier 2114 does not provide a current $i_{COMP1}$.

Accordingly, during this phase, the driver circuit 2116 operates with an open loop control by using the previous stored value $V_{COMP1}$.

In various embodiments, the signal BON is also set during this phase, whereby the current generator 3100 is enabled. This accelerates the charge of the capacitance CFB, thereby accelerating the voltage rise at the terminal FB.

When the voltage at the terminal FB reaches the threshold $V_{THE\_OL}$, e.g. corresponding to REF1, the signals OL and BON are reset (e.g. to low). This deactivates the current generators 3100 and optionally 3102. Moreover, the error amplifier 2114 is reactivated, e.g. by connecting an input of the error amplifier 2114 to the terminal FB. Accordingly, from this moment, the voltage $V_{COMP1}$ depends again on the voltage at the terminal FB.

Of course, without prejudice to the principle of the invention, the details of construction and the embodiments may vary widely with respect to what has been described and illustrated herein purely by way of example, without thereby departing from the scope of the present invention, as defined by the ensuing claims.

For example, as mentioned before, instead of detecting the external burst mode by detecting a decrease in the voltage at the terminal FB, the control circuit 2112a may be configured to detect the external burst mode by detecting an increase in the voltage at the terminal FB. For example, in this case, the detection circuit 300 may be configured to set the signal BME:

to a first logic level (indicating that the external burst mode was activated, e.g. high) when the voltage at the terminal FB exceeds the threshold $V_{THE\_ON}$ (being greater than the reference voltage REF1), and to a second logic level (indicating that the external burst mode was deactivated, e.g. low) when the voltage at the terminal FB falls below the threshold $V_{THE\_OFF}$.

For example, in various embodiments, the threshold $V_{THE\_ON}$ may be greater than 120%, preferably between 150% and 300%, of the reference voltage REF1. Similarly, the threshold $V_{THE\_OFF}$ may the same range, and may either correspond to the threshold $V_{THE\_ON}$, or preferably is smaller than the threshold $V_{THE\_ON}$.

Moreover, the detection circuit 300 may set the signal OL:

to a first logic level (e.g. high) when the voltage at the terminal FB exceeds the threshold $V_{THE\_ON}$, thereby disabling/deactivating the error amplifier 2114, e.g. by opening the electronic switch 304; and to a second logic level (e.g. low) when the voltage at the terminal FB falls below the threshold $V_{THE\_OL}$ (being smaller than the threshold $V_{THE\_OFF}$, and preferably between 100% and 110% of the reference voltage REF1), thereby enabling/activating the error amplifier 2114, e.g. by closing the electronic switch 304.

Moreover, in this case, the current generators 3100 and optionally 3102 should provide a negative current used to discharge the capacitance CFB.

In any case, it is preferably to switch the terminal FB to ground as shown e.g. in FIG. 11, because this simplifies the implementation of the electronic switch 308 and the detection circuit 300.

What is claimed is:

1. A power factor correction (PFC) control circuit for a boost converter, the PFC control circuit comprising:
    a first terminal configured to provide a drive signal to an electronic switch of the boost converter;
    a second terminal configured to be connected to a voltage sensor to receive a feedback signal indicative of an output voltage generated by the boost converter;
    a third terminal configured to be connected to a compensation network;
    an error amplifier configured to generate a current as a function of a voltage at the second terminal and a reference voltage, wherein an output of the error amplifier is coupled to the third terminal;
    a driver circuit configured to generate the drive signal as a function of a voltage at the third terminal, wherein the driver circuit is configured selectively activate or deactivate the generation of the drive signal as a function of a burst mode enable signal;
    a detection circuit configured to:
        generate the burst mode enable signal as a function of the voltage at the second terminal;
        set the burst mode enable signal to a first logic level, thereby deactivating the generation of the drive signal by the driver circuit, when the voltage at the second terminal falls below a first threshold, the first threshold being smaller than 80% of the reference voltage; and
        set the burst mode enable signal to a second logic level, thereby activating the generation of the drive signal by the driver circuit, when the voltage at the second terminal exceeds a second threshold, the second threshold being equal to or greater than the first threshold, and the second threshold being smaller than 80% of the reference voltage; and an electronic control switch configured to connect the second terminal to a further reference voltage as a function of an external burst mode signal, wherein the further reference voltage is smaller than 80% of the reference voltage.

2. The PFC control circuit according to claim 1, wherein the first threshold and the second threshold are between 1% and 50% of the reference voltage.

3. The PFC control circuit according to claim 1, wherein the first threshold and the second threshold are between 5% and 25% of the reference voltage.

4. The PFC control circuit according to claim 1, further comprising a comparator circuit configured to:

deactivate the generation of the drive signal by the driver circuit, when the voltage at the third terminal falls below a third threshold; and activate the generation of the drive signal by the driver circuit, when the voltage at the third terminal exceeds a fourth threshold.

5. The PFC control circuit according to claim 1, wherein the PFC control circuit is configured to deactivate the error amplifier when the burst mode enable signal is set to the first logic level.

6. The PFC control circuit according to claim 5, wherein the PFC control circuit is configured to deactivate the error amplifier by driving at least one of:

a first electronic switch connected between the output of the error amplifier and the third terminal;

an enable terminal of the error amplifier; or a second electronic switch configured to provide to an input of the error amplifier either the voltage at the second terminal or the reference voltage.

7. The PFC control circuit according to claim 1, wherein the detection circuit is configured to generate an open-loop control signal as a function of the voltage at the second terminal, wherein the detection circuit is configured to:

set the open-loop control signal to a third logic level, when the voltage at the second terminal falls below the first threshold; and set the open-loop control signal to a fourth logic level, when the voltage at the second terminal exceeds a fifth threshold, the fifth threshold being greater than the second threshold; and wherein the PFC control circuit is configured to deactivate the error amplifier when the open-loop control signal is set to the third logic level.

8. The PFC control circuit according to claim 7, wherein the fifth threshold is between 90% and 100% of the reference voltage.

9. The PFC control circuit according to claim 7, wherein the detection circuit is configured to generate a boost control signal as a function of the voltage at the second terminal, wherein the detection circuit is configured to:

set the boost control signal to a fifth logic level, when the voltage at the second terminal exceeds the second threshold; and set the boost control signal to a sixth logic level, when the voltage at the second terminal exceeds the fifth threshold; and wherein the PFC control circuit comprises a voltage or current generator configured to apply a first voltage or first current, respectively, to the second terminal when the boost control signal has the fifth logic level.

10. The PFC control circuit according to claim 9, further comprising:

a first current generator configured to apply a first current to the second terminal when the boost control signal has the first logic level; and a second current generator configured to apply a second current to the second terminal when the open-loop control signal or the burst mode enable signal has the first logic level, the first current being greater than the second current.

11. PFC control circuit according to claim 1, wherein the PFC control circuit is disposed on an integrated circuit, and wherein the first, second and third terminals are connected to first, second and third pads, respectively, of the integrated circuit.

12. A power supply comprising:

a power factor correction (PFC) control circuit of a boost converter, the PFC control circuit comprising:

a first terminal configured to provide a drive signal to an electronic switch of the boost converter;

a second terminal configured to be connected to a voltage sensor to receive a feedback signal indicative of an output voltage generated by the boost converter;

a third terminal configured to be connected to a compensation network;

an error amplifier configured to generate a current as a function of a voltage at the second terminal and a reference voltage, wherein an output of the error amplifier is coupled to the third terminal;

a driver circuit configured to generate the drive signal as a function of a voltage at the third terminal, wherein the driver circuit is configured selectively activate or deactivate the generation of the drive signal as a function of a burst mode enable signal; and a detection circuit configured to:

generate the burst mode enable signal as a function of the voltage at the second terminal;

set the burst mode enable signal to a first logic level, thereby deactivating the generation of the drive signal by the driver circuit, when the voltage at the second terminal falls below a first threshold, the first threshold being smaller than 80% of the reference voltage; and set the burst mode enable signal to a second logic level, thereby activating the generation of the drive signal by the driver circuit, when the voltage at the second terminal exceeds a second threshold, the second threshold being equal to or greater than the first threshold, and the second threshold being smaller than 80% of the reference voltage; and the boost converter further comprising:

first and second input terminals configured to receive a direct current (DC) input voltage;

first and second output terminals configured to provide the output voltage;

an inductance and the electronic switch connected in series between the first and second input terminals;

a further electronic switch connected between an intermediate point between the inductance and the electronic switch, and the first output terminal, wherein the second output terminal is connected to the second input terminal;

an output capacitor connected between the first and second output terminals;

the voltage sensor, coupled to the second terminal of the PFC control circuit;
the compensation network, connected to the third terminal of the PFC control circuit, and comprising at least one capacitance; and
an electronic control switch configured to connect the second terminal of the PFC control circuit to a further reference voltage as a function of an external burst mode signal, the further reference voltage being smaller than 80% of the reference voltage.

13. The power supply according to claim 12, further comprising:
a DC/DC electronic converter configured to receive the output voltage generated by the boost converter and provide at a converter output a regulated output current or regulated output voltage, the DC/DC electronic converter configured to generate the external burst mode signal.

14. A method of operating a power supply, the power supply comprising:
a power factor correction (PFC) control circuit of a boost converter, the PFC control circuit comprising:
a first terminal configured to provide a drive signal to an electronic switch of the boost converter;
a second terminal configured to be connected to a voltage sensor to receive a feedback signal indicative of an output voltage generated by the boost converter;
a third terminal configured to be connected to a compensation network;
an error amplifier configured to generate a current as a function of a voltage at the second terminal and a reference voltage, wherein an output of the error amplifier is coupled to the third terminal;
a driver circuit configured to generate the drive signal as a function of a voltage at the third terminal, wherein the driver circuit is configured selectively activate or deactivate the generation of the drive signal as a function of a burst mode enable signal; and
a detection circuit configured to generate the burst mode enable signal as a function of the voltage at the second terminal;
the boost converter further comprising:
first and second input terminals configured to receive a direct current (DC) input voltage;
first and second output terminals configured to provide the output voltage;
an inductance and the electronic switch connected in series between the first and second input terminals;
a further electronic switch connected between an intermediate point between the inductance and the electronic switch, and the first output terminal, wherein the second output terminal is connected to the second input terminal;
an output capacitor connected between the first and second output terminals;
the voltage sensor, coupled to the second terminal of the PFC control circuit;
the compensation network, connected to the third terminal of the PFC control circuit, and comprising at least one capacitance;
an electronic control switch configured to connect the second terminal of the PFC control circuit to a further reference voltage as a function of an external burst mode signal, the further reference voltage being smaller than 80% of the reference voltage; and a DC/DC electronic converter configured to receive the output voltage generated by the boost converter and provide at a converter output a regulated output current or regulated output voltage, the DC/DC electronic converter configured to generate the external burst mode signal;
the method comprising:
detecting within the DC/DC electronic converter a first output load condition;
in response to detecting the first output load condition:
deactivating switching activity of the DC/DC electronic converter and setting the external burst mode signal to a first logic level, thereby closing the electronic control switch; and
setting the burst mode enable signal to the first logic level, thereby deactivating the generation of the drive signal by the driver circuit, in response to the voltage at the second terminal falling below a first threshold, the first threshold being smaller than 80% of the reference voltage;
detecting within the DC/DC electronic converter a second output load condition; and
in response to detecting the second output load condition:
activating the switching activity of the DC/DC electronic converter and setting the external burst mode signal to a second logic level, thereby opening the electronic control switch; and
setting the burst mode enable signal to the second logic level, thereby activating the generation of the drive signal by the driver circuit, in response to the voltage at the second terminal exceeding a second threshold, the second threshold being equal to or greater than the first threshold, and the second threshold being smaller than 80% of the reference voltage.

15. The method according to claim 14, wherein the first threshold and the second threshold are between 5% and 25% of the reference voltage.

16. The method according to claim 14, further comprising:
deactivating, by a comparator circuit, the generation of the drive signal by the driver circuit, in response to the voltage at the third terminal falling below a third threshold; and
activating, by the comparator circuit, the generation of the drive signal by the driver circuit, in response to the voltage at the third terminal exceeding a fourth threshold.

17. The method according to claim 14, further comprising deactivating, by the PFC control circuit, the error amplifier in response to the burst mode enable signal being set to the first logic level.

18. The method according to claim 17, wherein deactivating the error amplifier comprises the PFC control circuit driving at least one of:
a first electronic switch connected between the output of the error amplifier and the third terminal;
an enable terminal of the error amplifier; or
a second electronic switch configured to provide to an input of the error amplifier either the voltage at the second terminal or the reference voltage.

19. The method according to claim 14, further comprising:
generating, by the detection circuit, an open-loop control signal as a function of the voltage at the second terminal;

setting, by the detection circuit, the open-loop control signal to a third logic level, in response to the voltage at the second terminal falling below the first threshold;

setting, by the detection circuit, the open-loop control signal to a fourth logic level, in response to the voltage at the second terminal exceeding a fifth threshold, the fifth threshold being greater than the second threshold; and deactivating, by the PFC control circuit, the error amplifier in response to the open-loop control signal being set to the third logic level.

20. The method according to claim 19, wherein the fifth threshold is between 90% and 100% of the reference voltage.

21. The method according to claim 19, further comprising:

generating, by the detection circuit, a boost control signal as a function of the voltage at the second terminal;

setting, by the detection circuit, the boost control signal to a fifth logic level, in response to the voltage at the second terminal exceeding the second threshold;

setting, by the detection circuit, the boost control signal to a sixth logic level, in response to the voltage at the second terminal exceeding the fifth threshold; and applying, by a voltage or current generator of the PFC control circuit, a first voltage or first current, respectively, to the second terminal in response to the boost control signal having the fifth logic level.

22. The method according to claim 21, further comprising:

applying, by a first current generator, a first current to the second terminal in response to the boost control signal having the first logic level; and applying, by a second current generator, a second current to the second terminal in response to the open-loop control signal or the burst mode enable signal having the first logic level, the first current being greater than the second current.

* * * * *